(12) United States Patent
He et al.

(10) Patent No.: US 11,778,215 B2
(45) Date of Patent: Oct. 3, 2023

(54) CODING OUTPUT LAYER SET DATA AND CONFORMANCE WINDOW DATA OF HIGH LEVEL SYNTAX FOR VIDEO CODING

(71) Applicant: QUALCOMM Incorporated, San Diego, CA (US)

(72) Inventors: Yong He, San Diego, CA (US); Vadim Seregin, San Diego, CA (US); Muhammed Zeyd Coban, Carlsbad, CA (US); Nan Hu, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/249,264

(22) Filed: Feb. 25, 2021

(65) Prior Publication Data

US 2021/0274204 A1 Sep. 2, 2021

Related U.S. Application Data

(60) Provisional application No. 63/003,574, filed on Apr. 1, 2020, provisional application No. 62/983,128, filed on Feb. 28, 2020.

(51) Int. Cl.
*H04N 19/44* (2014.01)
*H04N 19/172* (2014.01)
(Continued)

(52) U.S. Cl.
CPC .......... *H04N 19/44* (2014.11); *H04N 19/172* (2014.11); *H04N 19/1883* (2014.11); *H04N 19/70* (2014.11)

(58) Field of Classification Search
CPC .............................. H04N 19/44; H04N 19/172
See application file for complete search history.

(56) References Cited

U.S. PATENT DOCUMENTS

2015/0304666 A1  10/2015  Seregin et al.
2015/0373361 A1  12/2015  Wang et al.
(Continued)

OTHER PUBLICATIONS

Bross B., et al., "Versatile Video Coding (Draft 8)", Joint Video Experts Team (JVET) of ITU-T SG 16 WP 3 and ISO/IEC JTC 1/SC 29/WG 11, 17th Meeting, Brussels, BE, Jan. 7-17, 2020, JVET-Q2001-vA, 519 Pages.

(Continued)

*Primary Examiner* — Jerry T Jean Baptiste
(74) *Attorney, Agent, or Firm* — Shumaker & Sieffert, PA

(57) ABSTRACT

In one example, a device for decoding video data includes one or more processors implemented in circuitry and configured to: determine that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, infer values for OLS PTL index values, without explicitly decoding values for the OLS PTL index values; and decode video data of one or more OLSs using corresponding PTL data structures of the PTL data structures in the VPS according to the inferred values for the OLS PTL index values.

30 Claims, 8 Drawing Sheets

(51) Int. Cl.
*H04N 19/169* (2014.01)
*H04N 19/70* (2014.01)

(56) References Cited

U.S. PATENT DOCUMENTS

| | | | |
|---|---|---|---|
| 2016/0191926 A1 | 6/2016 | Deshpande et al. | |
| 2017/0019673 A1 | 1/2017 | Tsukuba et al. | |
| 2022/0394304 A1* | 12/2022 | Deng | H04N 19/167 |

OTHER PUBLICATIONS

Bross B., et al., "Versatile Video Coding (Draft 8)", JVET-Q2001-vC, Joint Video Experts Team (JVET) of ITU-T SG 16 WP 3 and ISO/IEC JTC 1/SC 29/WG 11, 17th Meeting: Brussels, BE, Jan. 7-17, 2020, 512 pages.
He Y., et al., "AHG9: Miscellaneous HLS Topics", JVET-R0266, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-5.
He Y., et al., "AHG9: On Decoding Capability Information", JVET-R0260, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-2.
He Y., et al., "AHG9: On PPS Syntax", JVET-R0262-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-4.
He Y., et al., "AHG9: On VPS Syntax", JVET-R0261, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-6.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Seregin V., et al., "AHG8: On PTL, HRD, and DPB Structures Signalling in VPS and SPS", JVET-R0275-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-10.
Suehring K., et al., "AHG17: Conformance Window", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0352, Mar. 12, 2019 (Mar. 12, 2019), XP030202762, 2 pages, Retrieved from the Internet: URL: http://phenix.int-evry.fr/jvet/doc_end_user/documents/14_Geneva/wg11/JVET-N0352-v1.zip. JVET-N0352.docx [retrieved on Mar. 12, 2019].
Bross B., et al., "Versatile Video Coding (Draft 8)," 17.JVET Meeting, Jan. 7, 2020-Jan. 17, 2020, Brussels, (The Joint Video Exploration Team of ISO/IEC JTC1/SC29/WG11 and ITU-T SG.16), No. JVET-Q2001, m52905, Jan. 18, 2020 (Jan. 18, 2020), XP030224281, 515 pages, Retrieved from the Internet: URL: http://phenix.int-evry.fr/jvet/doc_end_user/documents/17_Brussels/wg11/JVET-Q2001-v2.zip JVET-Q2001-v2.docx [retrieved on Jan. 18, 2020] Section 7.3.2.2 and 7.4.3.2.
Chen (Broadcom) P., et al., "AHG8: Adaptive Resolution Change", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0303, m48413, Jul. 5, 2019 (Jul. 5, 2019), XP030219199, 8 Pages, Retrieved from the Internet: URL: http://phenix.int-evry.fr/vet/doc_end_user/documents/15_Gothenburg/wg11/JVET-O0303-v3.zip JVET-O0303-v2.docx The whole document.
Deshpande (Sharp) S., et al., "AHG9: On PTL and HRD Parameters Signalling in VPS," 17, JVET Meeting, Jan. 7, 2020-Jan. 17, 2020, Brussels, (The Joint Video Exploration Team of ISO/IEC JTC1/SC29/WG11 and ITU-T SG.16), No. JVET-Q0786, m52810, Jan. 13, 2020, XP030224201, 4 pages, Retrieved from the Internet: URL: http://phenix.int-evry.fr/jvet/doc_end_user/documents/17_Brussels/wg11/JVET-Q0786-v2.zip JVET-Q0786-v2.docx [retrieved on Jan. 13, 2020].
International Search Report and Written Opinion—PCT/US2021/020050—ISA/EPO—dated Aug. 9, 2021.
Partial International Search Report—PCT/US2021/020050—ISA/EPO—dated May 26, 2021.
Rusanovskyy (Qualcomm) D., et al., "[EVC] Suggested Improvements for EVC Specification and Test Model", 129. MPEG Meeting, Jan. 13, 2020-Jan. 17, 2020, Brussels, (Motion Picture Expert Group or ISO/IEC JTC1/SC29/WG11), No. m52290, Jan. 16, 2020 (Jan. 16, 2020), XP030224893, Jan. 2019, 4 Pages, Retrieved from the Internet: URL: http://phenix.int-evry.fr/mpeg/doc_end_user/documents/129_Brussels/wg11/m52290-v4-m52291_hdr_r5.zipm52291_draftText_EVC_Study_Text_FDIS_23094-1 r2.docx.
Samuelsson J., et al., "AHG8: On Adaptive Resolution Change (ARC) High-Level Syntax(HLS)", 15. JVET Meeting, Jul. 3, 2019-Jul. 12, 2019, Gothenburg, (The Joint Video Exploration Team of ISO/IEC JTC 1/ SC29 /WG11 and ITU-TSG.16), No. JVET-O0204, m48313, Jun. 25, 2019 (Jun. 25, 2019), XP030218837, pp. 1-5, Retrieved from the Internet: URL: http://phenix.int-evry.fr/jvetjdoc_end_user/documents/15_Gothenburg/wg11/JVET-O0204-v1.zip,JVET-O0204.docx, [retrieved on Jun. 25, 2019], The whole document.
Samuelsson (Sharplabs) J., et al., "AHG8: On Adaptive Resolution Change (ARC) High-Level Syntax (HLS)", 15. JVET Meeting, Jul. 3, 2019-Jul. 12, 2019, Gothenburg, (The Joint Video Exploration Team of ISO/IEC JTC 1/ SC29 /WG11 and ITU-TSG.16 ), No. JVET-O0204, m48313, Jul. 5, 2019 (Jul. 5, 2019), XP030218840, 6 Pages, Retrieved from the Internet: URL: http://phenix.int-evry.fr/jvet/doc_end_user/documents/15_Gothenburg/wg11/JVET-O0204-v3.zip. JVET-O0204-v3.docx [retrieved on Jul. 5, 2019], The whole document.

* cited by examiner

CODING OUTPUT LAYER SET DATA AND CONFORMANCE WINDOW DATA OF HIGH LEVEL SYNTAX FOR VIDEO CODING

This application claims the benefit of U.S. Provisional Application No. 62/983,128, filed Feb. 28, 2020, and of U.S. Provisional Application No. 63/003,574, filed Apr. 1, 2020, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for processing and coding high level syntax (HLS) video data. For example, the HLS video data may include output layer sets (OLSs) and profile-tier-level (PTL) data structures. The HLS video data may further include data representing correspondence between the OLSs and the PTL data structures. However, when a number of the PTL data structures is equal to a total number of OLSs specified for a video parameter set (VPS), the correspondence between the OLSs and the PTL data structures may be inferred. In particular, indexes for the OLSs and the corresponding PTL data structures may be equal. In this manner, no indexes need be signaled in this situation, which may reduce signaling overhead and also simplify determination of the correspondence between OLSs and PTL data structures.

As another example, in some cases, namely when a picture parameter set (PPS) includes data indicating that a picture width and picture height have maximum possible values, no conformance cropping window data will be signaled in the PPS. Instead, conformance cropping window data for the PPS may be inferred from a corresponding sequence parameter set (SPS), such as the SPS for which an identifier is signaled in the PPS.

In one example, a method of decoding video data includes determining that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, inferring values for OLS PTL index values, without explicitly decoding values for the OLS PTL index values; and decoding video data of one or more OLSs using corresponding PTL data structures of the PTL data structures in the VPS according to the inferred values for the OLS PTL index values.

In another example, a device for decoding video data includes a memory configured to store video data; and one or more processors implemented in circuitry and configured to: determine that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, infer values for OLS PTL index values, without explicitly decoding values for the OLS PTL index values; and decode the video data of one or more OLSs using corresponding PTL data structures of the PTL data structures in the VPS according to the inferred values for the OLS PTL index values.

In another example, a computer-readable storage medium has stored thereon instructions that, when executed, cause a processor to: determine that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, infer values for OLS PTL index values, without explicitly decoding values for the OLS PTL index values; and decode video data of one or more OLSs using corresponding PTL data structures of the PTL data structures in the VPS according to the inferred values for the OLS PTL index values.

In another example, a device for decoding video data includes means for determining that a value for a syntax element representing a number of profile-tier-level (PTL) data structures in a video parameter set (VPS) of a bitstream is equal to a total number of output layer sets (OLSs) specified for the VPS; means for inferring values for OLS PTL index values, without explicitly decoding values for the OLS PTL index values, in response to determining that the value for the syntax element representing the number of profile-tier-level data structures in the VPS is equal to the total number of OLSs specified for the VPS; and means for decoding video data of one or more OLSs using corresponding PTL data structures of the PTL data structures in the VPS according to the inferred values for the OLS PTL index values.

The details of one or more examples are set forth in the accompanying drawings and the description below. Other features, objects, and advantages will be apparent from the description, drawings, and claims.

DETAILED DESCRIPTION

Figure 1:
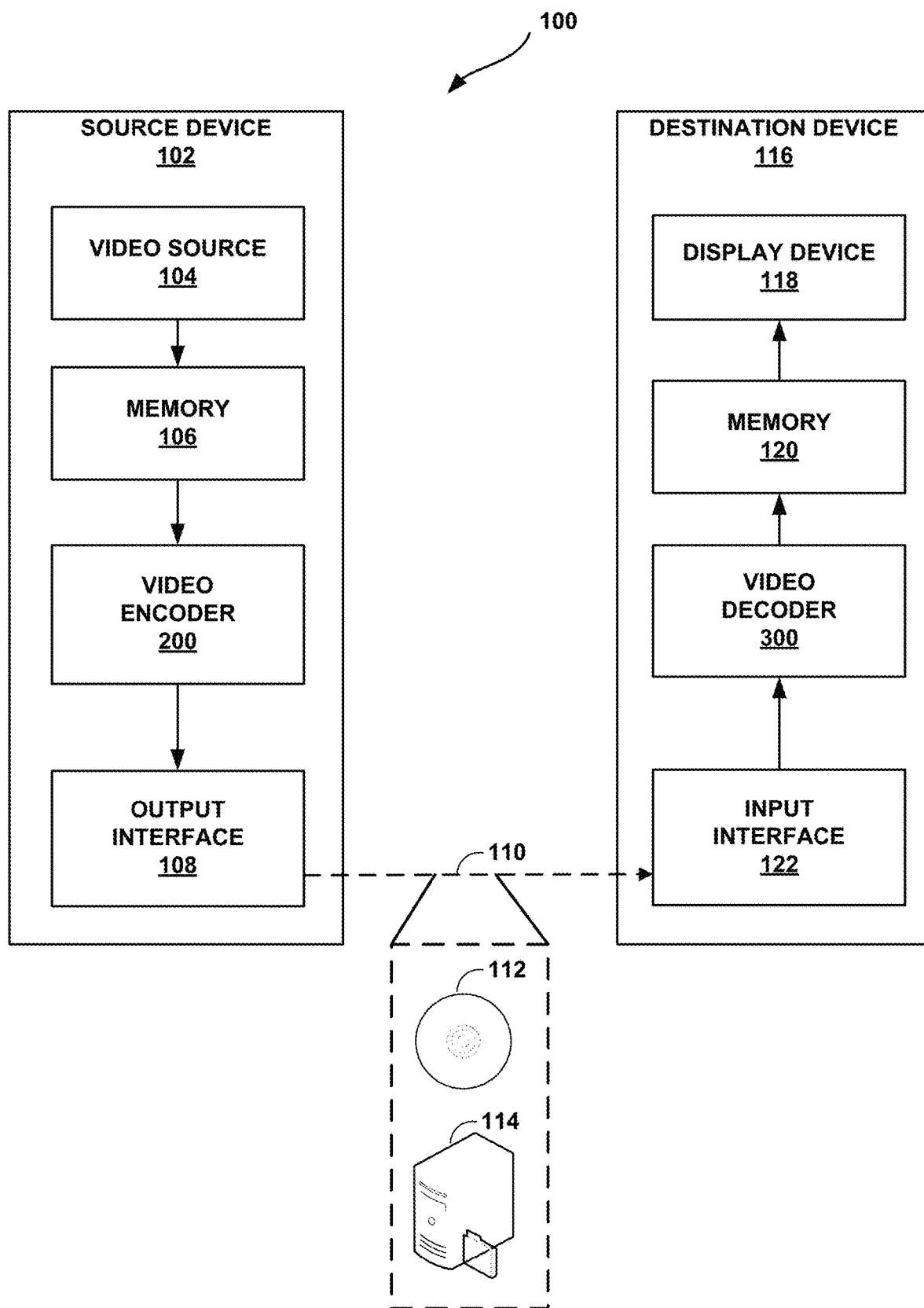
FIG. 1 is a block diagram illustrating an example video encoding and decoding system that may perform the techniques of this disclosure.

Versatile Video Coding (VVC) is under development by Joint Video Experts Team (WET) of ITU-T and ISO/IEC to achieve substantial video compression capabilities beyond ITU-T H.265 High Efficiency Video Coding (HEVC) for a broadened range of applications.

The current draft of VVC specifies normative bitstream and picture formats, high level syntax (HLS) and semantics, and the parsing and decoding processes for encoded video data. VVC also specifies profiles/tiers/levels (PTL) restrictions, byte stream format, hypothetical reference decoder (HRD), and supplemental enhancement information (SEI) in its annex.

VVC inherits a number of high-level features from HEVC, such as network abstraction layer (NAL) unit and parameter set concepts, tile and wave-front parallel processing, layered coding and the use of SEI messages for supplemental data signalling. More new high-level features are introduced in VVC, including rectangular slice and subpicture concepts, picture resolution adaptation, mixed NAL unit types, picture header, gradual decoding refresh (GDR) picture, virtual boundary, and the reference picture list (RPL) for reference picture management.

Parameter sets were introduced in H.264/AVC to fix the vulnerability of losing a picture header. Parameter sets either can be part of the video bitstream or can be received by a decoder through other means, such as out-of-band transmission, encoder or decoder hard coding, and so on. Below is a list of parameter sets currently specified in VVC:

Decoding Capability Information (DCI): contains sublayer, and PTL information not necessary for the decoding process.

Video parameter set (VPS): contains information such as layer dependency, output layer set (OLS) and PTL information that is applicable to multiple layers as well as sublayers.

Sequence parameter set (SPS): contains information such as maximum picture resolution, conformance window, subpicture layout and ID mapping, RPL and sequence level coding parameters that are applicable to coded layer video sequence (CLVS).

Picture parameter set (PPS): contains information such as picture resolution, conformance window and scaling window, tiles and slices partition, and picture level coding parameters that are applicable to multiple pictures.

Adaptation parameter set (APS) contains Adaptive Loop Filter (ALF): parameters, scaling list parameters and Luma Mapping with Chroma Scaling (LMCS) parameters that are applicable to slices.

VVC also specifies picture header to carry the parameters that can be shared by multiple slices in a picture to reduce the overhead.

This disclosure recognizes that certain features of the current VVC HLS design based on VVC draft 8 could be improved. Such improvements may reduce bitrate without negatively impacting video fidelity (e.g., increasing distortion). Likewise, such improvements may improve video encoder and/or decoder performance. For example, these improvements may reduce a number of processing cycles performed by the video coder without negatively impacting video fidelity.

As one example, this disclosure describes techniques related to signaling correspondences between output layer sets (OLSs) and profile-tier-level (PTL) data structures for the OLSs. An OLS includes a set of layers of video data to be output (which may be equivalent to or smaller than a set of layers of the video data to be decoded). PTL data structures describe a profile and tier and level values within the tier for a corresponding OLS. Conventionally, indexes are coded in the VPS to represent the correspondences between PTL data structures and OLSs, as long as there is more than one PTL data structure signaled in the VPS.

However, this disclosure recognizes that when the number of PTL data structures and the number of OLSs for the VPS are equal, the video encoder and video decoder may be configured to infer the correspondences between the PTL data structures and the OLSs. In particular, the video encoder and video decoder may determine that an $i^{th}$ PTL data structure corresponds to an $i^{th}$ OLS for all values of i between 0 and the total number of OLSs. Thus, the video encoder and the video decoder may use values of the $i^{th}$ PTL data structure to encode or decode video data of the $i^{th}$ OLS. For example, the video encoder and/or video decoder may initiate coding tools indicated as being used by the $i^{th}$ PTL data structure and disable coding tools that are not used according to the $i^{th}$ PTL data structure.

As another example, a sequence parameter set (SPS) and/or a picture parameter set (PPS) may signal data representative of a conformance window. In general, the conformance window specifies a picture area that is considered for conforming picture output. The SPS may signal a conformance window for an entire sequence of pictures, and the PPS may signal a conformance window refinement for individual pictures within the sequence of pictures. However, this disclosure recognizes that when a picture size for a picture in the sequence is a maximum possible picture size for the sequence, the conformance window refinement data need not be signaled in the PPS for that picture, because conformance window can be inferred from the SPS.

Accordingly, the video encoder and video decoder may infer a value for a syntax element (e.g., pps_conformance_window_flag) indicating whether the conformance window syntax elements themselves are signaled, and further, infer values for the conformance window syntax elements when the picture has a maximum size. Thus, the video encoder and video decoder may be configured to code values for the conformance window syntax elements of a PPS only when the picture size indicated by the PPS is less than the maximum picture size. The picture size may be less than the maximum picture size when a signaled picture width and/or picture height is less than a corresponding maximum width and/or height, respectively.

Furthermore, when the syntax element of the PPS indicating whether the conformance window syntax elements are signaled (e.g., pps_conformance_window_flag) indicates that the conformance window syntax elements are not signaled (e.g., when the picture size is equal to the maximum picture size), the video encoder and the video decoder may be configured to infer that the PPS conformance window syntax elements are equal to the corresponding SPS conformance window syntax elements.

Decoding capability information (DCI) is currently specified as a non-VCL NAL unit, but the information is not necessary for a decoding process, and none of the parameter sets or VCL NAL unit refers to DCI. This disclosure describes techniques including removal of the DCI parameter set and carrying decoding capability information in SEI message. Table 1 below shows the DCI syntax structure of VVC.

TABLE 1

DCI RBSP SYNTAX

|  | Descriptor |
|---|---|
| decoding_capability_information_rbsp( ) { |  |
|   dci_max_sublayers_minus1 | u(3) |
|   dci_reserved_zero_bit | u(1) |
|   dci_num_ptls_minus1 | u(4) |
|   for( i = 0; i <= dci_num_ptls_minus1; i++ ) |  |
|     profile_tier_level( 1, 0 ) |  |
|   dci_extension_flag | u(1) |
|   if( dci_extension_flag ) |  |
|     while( more_rbsp_data( ) ) |  |
|       dci_extension_data_flag | u(1) |
|   rbsp_trailing_bits( ) |  |
| } |  |

Layer dependency information is signaled in a VPS, according to VVC, conditioned by the value of the vps_all_independent_layers_flag. The dependency of each layer is explicitly signaled unless all layers are independent layers. Table 2 below shows a partial VPS syntax structure according to VVC.

TABLE 2

VPS RBSP

|  | Descriptor |
|---|---|
| video_parameter_set_rbsp( ) { |  |
|   vps_video_parameter_set_id | u(4) |
|   vps_max_layers_minus1 | u(6) |
|   vps_max_sublayers_minus1 | u(3) |
|   if( vps_max_layers_minus1 > 0 && |  |
|   vps_max_sublayers_minus1 > 0 ) |  |

TABLE 2-continued

VPS RBSP

|  | Descriptor |
|---|---|
|     vps_all_layers_same_num_sublayers_flag | u(1) |
|   if( vps_max_layers_minus1 > 0 ) |  |
|     vps_all_independent_layers_flag | u(1) |
|   for( i = 0; i <= vps_max_layers_minus1; i++ ) { |  |
|     vps_layer_id[ i ] | u(6) |
|     if( i > 0 && !vps_all_independent_layers_flag ) { |  |
|       vps_independent_layer_flag[ i ] | u(1) |
|       if( !vps_independent_layer_flag[ i ] ) { |  |
|         for( j = 0; j < i; j++ ) |  |
|           vps_direct_ref_layer_flag[ i ][ j ] | u(1) |
|         max_tid_ref_present_flag[ i ] | u(1) |
|         if( max_tid_ref_present_flag[ i ] ) |  |
|           max_tid_il_ref_pics_plus1[ i ] | u(3) |
|       } |  |
|     } |  |
|   } |  |
|   ... |  |
| } |  |

One common case for layer coding is that the i-th layer may have only one direct dependent layer, and the direct dependent layer is (i−1)-th layer where i is great than 0. This is based on the ols_mode_idc semantics of VVC, which are as follows.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output. ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

This disclosure describes techniques that may be used to avoid explicit signaling of dependency information for each layer, e.g., for this common case. By avoiding explicit signaling of this dependency information in this manner, bitrate for a video bitstream including multiple layers in this fashion may be reduced, without reducing video quality (e.g., without increasing video distortion). Likewise, video encoders and video decoders may avoid processing explicitly signaled video dependency information, which may improve performance of the video encoders and video decoders.

Table 2 above includes a max_tid_ref_pics_plus1 syntax element to indicate sublayers including pictures that may be used as inter-layer reference pictures (ILRP) for decoding a current layer. It is possible that all layers share the same sublayers property, such that explicit signaling for each layer may not be necessary. In addition, the sublayer ILRP indication is mainly used for dropping lower layer sublayer pictures that are not used for reference and not output. Thus, it may not be efficient to signal such indication for each layer.

VVC specifies that the 0-th output layer set (OLS) contains only the lowest layer, and LayerIdInOls[0][0] is to be inferred to be equal to vps_layer_id[0] in the derivation of LayerIdInOls[i][j]. There may be multiple dependent trees available in the VPS. This disclosure describes techniques to assign each independent non-base layer to an individual OLS.

An index to the list of profile_tier_level( ) (PTL) syntax structures, ols_ptl_idx, and the index to the list of decoded picture buffer (DPB) dpb_parameters( ) syntax structures, ols_dbp_params_index, are signaled in VPS, according to VVC. This disclosure describes techniques for skipping this signaling when the total number of syntax structures is equal to the same number of OLSs, to reduce the signaling overhead. Thus, these techniques may reduce bitrate of a video bitstream without reducing video quality.

The first 16 bits of an SPS may be equal to '00000000 00000000', which may emulate the start code depending on the following syntax element value. Even though the use of the syntax element emulation_prevention_three_byte for encapsulation may prevent the emulation of start codes within NAL units, it may be straightforward to prevent start code emulation in the first place. This disclosure describes techniques for preventing start code emulation, which may improve video bitstream bitrate without reducing video quality.

VVC specifies a constraint on conformance window syntax elements in the PPS as follows: when pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively. An alternative way to simplify the constraint would be to constrain the pps_conformance_window_flag directly. However, the inference of the values of pps_conf_win_left_offset, pps_conf_win_right_offset, pps_conf_win_top_offset, and pps_conf_win_bottom_offset in VVC is "When pps_conformance_window_flag is equal to 0, the values of pps_conf_win_left_offset, pps_conf_win_right_offset, pps_conf_win_top_offset, and pps_conf_win_bottom_offset are inferred to be equal to 0." This disclosure describes techniques for improving the inference of these values, e.g., to reduce processing operations performed by a video encoder and a video decoder.

VVC specifies SPS picture order count (POC) most significant bits (MSB) syntax elements for signaling POC MSBs, e.g., to indicate pictures to include in a reference picture set or reference picture list. In particular, VVC specifies values for sps_poc_msb_flag to indicate whether a ph_poc_msb_present_flag syntax element is present in picture headers (PHs) referring to the SPS or not. When sps_poc_msb_flag is equal to 1, another syntax element, poc_msb_len_minus1 is signaled to specify the length, in bits, of the poc_msb_val syntax elements in PHs referring to the SPS. Table 3 and Table 4 below show partially relevant SPS and PH syntax structures. This disclosure describes techniques to converge two syntax elements into one element for simplification, which may reduce processing demands on video encoders and video decoders, and also may reduce bitrate of video bitstreams without reducing video quality. This disclosure also describes an example including signaling a general constraint flag, to allow POC MSB to be updated at a PH.

TABLE 3

| SPS RBSP | |
| --- | --- |
| | Descriptor |
| seq_parameter_set_rbsp( ) {<br>  sps_seq_parameter_set_id<br>  ... | u(4) |

TABLE 3-continued

| SPS RBSP | |
| --- | --- |
| | Descriptor |
|   sps_poc_msb_flag<br>  if( sps_poc_msb_flag )<br>    poc_msb_len_minus1<br>  ...<br>} | u(1)<br><br>ue(v)<br>u(2) |

TABLE 4

| PICTURE HEADER RBSP | |
| --- | --- |
| | Descriptor |
| picture_header_structure( ) {<br>  gdr_or_irap_pic_flag<br>  ...<br>  if( sps_poc_msb_flag ) {<br>    ph_poc_msb_present_flag<br>    if( ph_poc_msb_present_flag )<br>      poc_msb_val<br>  }<br>  ...<br>} | u(1)<br><br><br>u(1)<br><br>u(v) |

VVC specifies data for signaling slice height deviations for slices of pictures. In particular, according to VVC, "num_exp_slices_in_tile[i] specifies the number of explicitly provided slice heights in the current tile that contains more than one rectangular slice. The value of num_exp_slices_in_tile[I] shall be in the range of 0 to RowHeight [tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1." Per VVC, when a slice contains multiple tiles, num_exp_slices_in_tile[i] is not present and the value of the variable NumSlicesInTile[i] is derived to be equal to 1. According to VVC, when a slice contains one tile, the value of num_exp_slices_in_tile[i] is equal to 1 and NumSlicesInTile[i] is also derived to be equal to 1.

This disclosure recognizes that these semantics may be problematic for certain scenarios. In particular, when num_exp_slices_in_tile[i] is greater than 0, the variable NumSlicesInTile[i] and SliceHeightInCtusMinus1[i+k] for k in the range of 0 to NumSlicesInTile[i]−1 may be derived as shown below:

```
remainingHeightInCtbsY =
   RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
   SliceHeightInCtusMinus1[ i++ ] = exp_slice_height_in_ctu_minus1[ j ]
   remainingHeightInCtbsY −= SliceHeightInCtusMinus1[ j ]
}
uniformSliceHeightMinus1 = SliceHeightInCtusMinus1[ i − 1 ]
while( remainingHeightInCtbsY >= (uniformSliceHeightMinus1 + 1) ) {
   SliceHeightInCtusMinus1[ i++ ] = uniformSliceHeightMinus1
   remainingHeightInCtbsY −= (uniformSliceHeightMinus1 + 1)
   j++
}
if( remainingHeightInCtbsY > 0 ) {
   SliceHeightInCtusMinus1[ i++ ] = remainingHeightInCtbsY
   j++
}
NumSlicesInTile[ i ] = j
```

This disclosure recognizes that the derivation process above may be problematic when there is only one slice in the tile as SliceHeightInCtusMinus1[i−1] is undefined when numExpSliceInTile is equal to 1. This disclosure describes techniques that may be used to resolve these issues.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding values of high level syntax elements. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding values of high level syntax elements. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vA (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction ($y=16$) and 16 samples in a horizontal direction ($x=16$). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the various techniques of this disclosure, video encoder 200 and video decoder 300 may code (encode and decode, respectively) values for high level syntax elements. In one example, video encoder 200 and video decoder 300 may code a decoding capability information (DCI) supplemental enhancement information (SEI) message. The DCI SEI message may provide video decoder 300 with decoding capability information required by associated bitstream, including a maximum number of sublayers and a list of profile/tier/level information. Table 5 below represents an example DCI SEI message syntax, where profile_tier_level( ) may be according to the specifications of current VVC.

TABLE 5

DCI SEI MESSAGE EXAMPLE I

| | Descriptor |
|---|---|
| decoding_capability_info(payLoadSize ) { | |
|   dci_max_sublayers | u(3) |
|   dci_num_ptls | u(4) |
|   for( i = 0; i < dci_num_ptls; i++ ) | |
|     profile_tier_level( 1, 0 ) | |
| } | |

Semantics for the syntax elements of the example of Table 5 may be defined as follows:

dci_max_sublayers specifies the maximum number of temporal sublayers that may be present in a layer in each CVS of the bitstream. The value of dci_max_sublayers shall be in the range of 1 to 7, inclusive.

dci_num_ptls specifies the number of profile_tier_level( ) syntax structures in the DCI SEI message.

Table 6 represents another example DCI SEI message syntax in which the DCI SEI message maximum general_profile_idc, maximum general_level_idc and a list of general_sub_profile_idc to be supported by video decoder 300:

TABLE 6

DCI SEI MESSAGE EXAMPLE II

| | Descriptor |
|---|---|
| decoding_capability_info(payLoadSize ) { | |
|   dci_max_sublayers | u(3) |
|   dci_max_profile_idc | u(7) |
|   dci_max_level_idc | u(8) |
|   dci_num_sub_profiles | u(8) |
|   for( i = 0; i < num_sub_profiles; i++ ) | |
|     general_sub_profile_idc[ i ] | u(32) |
| } | |

Semantics for the syntax elements of the example of Table 6 may be defined as follows:

dci_max_profile_idc specifies the highest values of general_profile_idc to be supported by the decoder. Bitstreams shall not contain values of general_profile_idc other than those specified in Annex A of VVC.

dci_max_level_idc specifies the highest values of general_level_idc to be supported by the decoder. Bitstreams shall not contain values of general_level_idc other than those specified in Annex A of VVC.

The semantics of dci_max_sublayers, dci_num_sub_profiles and general_sub_profile_idc may be the same as specified in VVC.

In another example, the profile_idc value signaled in the DCI SEI message may represent a profile that provides the preferred decoded result or the preferred bitstream identification as determined by video encoder 200.

In this manner, video encoder 200 may encode, and video decoder 300 may decode, a DCI SEI message including, e.g., a syntax element representing a maximum number of sublayers that may be present in each coded video sequence (CVS) of the bitstream. Video encoder 200 may also encode, and video decoder 300 may also decode, a DCI SEI message including a syntax element representing a number of profile/tier/level syntax structures included in the DCI SEI message. Alternatively, another element of source device 102 (e.g., output interface 108 or a post-processing unit, not shown in FIG. 1) and another element of destination device 116 (e.g., input interface 122 or a pre-processing unit or media data retrieval unit, not shown in FIG. 1) may process the DCI SEI message for a video bitstream. Destination device 116 may use this data to determine whether video decoder 300 is capable of decoding the video bitstream. Source device 102 may signal this data to indicate required capabilities for a video decoder to be able to decode a corresponding video bitstream.

When video decoder 300 is not capable of decoding the video bitstream, destination device 116 may select an alternative video bitstream using, e.g., a different corresponding DCI SEI message that video decoder 300 is capable of decoding. For example, if multiple versions of a particular video program are available, destination device 116 may retrieve the DCI SEI messages for each of the versions and select one of the versions that video decoder 300 is capable of decoding as indicated by the information of the corresponding DCI SEI message. In this manner, these techniques allow destination device 116 to determine whether video decoder 300 is capable of decoding a video bitstream without retrieving a DCI parameter set for the video bitstream, which may reduce wasted bandwidth consumption and reduce latency associated with retrieving video data that video decoder 300 is capable of decoding.

Video encoder 200 and video decoder 300 may, additionally or alternatively, be configured to code layer dependency information as discussed below. In the example below, the layer dependency information is specified in a video parameter set (VPS). Table 7 below represents an example VPS including layer dependency information according to these techniques, in which text added relative to VVC is indicated using the notation [added: "added text"].

TABLE 7

EXAMPLE VPS INCLUDING LAYER DEPENDENCY INDICATION

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |

TABLE 7-continued

EXAMPLE VPS INCLUDING LAYER
DEPENDENCY INDICATION

| | Descriptor |
|---|---|
| [added: "vps_layer_dependency_idc"] | u(2) |
| for( i = 0; i <= vps_max_layers_minus1; i++ ) { | |
|   vps_layer_id[ i ] | u(6) |
|   if( i > 0 && [added: "vps_layer_dependency_idc == 2"] ) { | |
|     vps_independent_layer_flag[ i ] | u(1) |
|     if( !vps_independent_layer_flag[ i ] ) { | |
|       for( j = 0; j < i; j++ ) | |
|         vps_direct_ref_layer_flag[ i ][ j ] | u(1) |
|       max_tid_ref_present_flag[ i ] | u(1) |
|       if( max_tid_ref_present_flag[ i ] ) | |
|         max_tid_il_ref_pics_plus1[ i ] | u(3) |
|     } | |
|   } | |
| } | |
| if( vps_max_layers_minus1 > 0 ) { | |
|   if([added: "vps_layer_dependency_idc == 0"] ) | |
|     each_layer_is_an_ols_flag | u(1) |
|   if( !each_layer_is_an_ols_flag ) { | |
|     if([added: "vps_layer_dependency_idc"]) | |
|       ols_mode_idc | u(2) |
|     if( ols_mode_idc = = 2 ) { | |
|       num_output_layer_sets_minus1 | u(8) |
|       for( i = 1; i <= num_output_layer_sets_minus1; i ++) | |
|         for( j = 0; j <= vps_max_layers_minus1; j++ ) | |
|           ols_output_layer_flag[ i ][ j ] | u(1) |
|     } | |
|   } | |
| } | |
| ... | |
| rbsp_trailing_bits( ) | |
| } | |

Semantics for the vps_layer_dependency_idc syntax element of the VPS in the example of Table 7 and other existing syntax elements of VVC may be defined as follows. Text added relative to VVC is indicated using the notation [added: "added text"].

[added: "vps_layer_dependency_idc equal to 0 specifies that all layers in the CVS are independently coded without using inter-layer prediction. vps_layer_dependency_idc equal to 1 specifies that all non-base layers in the CVS uses inter-layer prediction, the layer with index i is a direct reference layer for the layer with index (i+1) and sublayers of all layers except the highest layer are used for inter-layer prediction. vps_layer_dependency_idc equal to 2 specifies that one or more of the layers in the CVS may use inter-layer prediction. The value of vps_layer_dependency_idc shall be in the range of 0 to 2, inclusive. The value 3 of ols_mode_idc is reserved for future use by ITU-T|ISO/IEC. When not present, the value of vps_layer_dependency_idc is inferred to be equal to 0."

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. [added: "When vps_independent_layer_flag is not present, the value of vps_independent_layer_flag[i] is inferred to be equal to 1 when vps_layer_dependency_idc is equal to 0; and the value of vps_independent_layer_flag[i] is inferred to be equal to 0 when vps_layer_dependency_idc is equal to 1."]

In an alternative expression, the inference rule can be expressed as follows: [added: "When vps_independent_layer_flag is not present, the value of vps_independent_layer_flag[i] is inferred to be equal to 1−vps_layer_dependency_idc."]

vps_direct_ref_layer_flag[i][j] equal to 0 specifies that the layer with index j is not a direct reference layer for the layer with index i. vps_direct_ref layer flag [i][j] equal to 1 specifies that the layer with index j is a direct reference layer for the layer with index i. [added: "When vps_direct_ref layer flag is not present, it is inferred as follows: when vps_layer_dependency_idc is equal to 0, vps_direct_ref_layer_flag[i][j] for i and j in the range of 0 to vps_max_layers_minus1, inclusive, is inferred to be equal to 0. When vps_layer_dependency_idc is equal to 1, vps_direct_ref_layer_flag[i][j] for i and j in the range of 0 to vps_max_layers_minus1, inclusive, is inferred to be equal to 0 when i is not equal to (j+1) and inferred to be equal to 1 when i is equal to (j+1)."] When vps_layer_dependency_idc is not equal to 0, there shall be at least one value of j in the range of 0 to i−1, inclusive, such that the value of vps_direct_ref_layer_flag[i][j] is equal to 1.

max_tid_il_ref_pics_plus1[i] equal to 0 specifies that inter-layer prediction is not used by non-IRAP pictures of the i-th layer. max_tid_il_ref_pics_plus1[i] greater than 0 specifies that, for decoding pictures of the i-th layer, no picture with TemporalId greater than max_tid_il_ref_pics_plus1[i]−1 is used as ILRP. [added: "When max_tid_il_ref_pics_plus1 is not present, the value of max_tid_il_ref_pics_plus1 is inferred as follows: when vps_layer_dependency_idc is equal to 0, the value of max_tid_il_ref_pics_plus1[i] is inferred to be equal to 0; when vps_layer_dependency_idc is equal to 1, the value of max_tid_il_ref_pics_plus1[i] is inferred to be equal to 7."]

When [added: "vps_layer_dependency_idc is equal to 0"] and each_layer_is_an_ols_flag is equal to 0, the value of ols_mode_idc is inferred to be equal to 2.

Accordingly, video encoder 200 and video decoder 300 may be configured to code values for VPS layer dependency indicator syntax elements, VPS independent layer syntax elements, VPS direct reference layer syntax elements, and maximum temporal identifier inter-layer reference picture syntax elements according to the example syntax and semantics above.

Additionally or alternatively, video encoder 200 and video decoder 300 may code sub-layer inter-layer reference picture (ILRP) information as follows. Table 8 below shows an example VPS including sublayer ILRP information. In particular, as in the existing VPS of VVC, max_tid_il_ref_pics_plus1 is used to indicate the sublayers including pictures used as ILRP for decoding pictures of a current layer. However, in the example of Table 8, video encoder 200 and video decoder 300 may only code a value for max_tid_il_ref_pics_plus1 under certain conditions.

TABLE 8

EXAMPLE VPS INCLUDING ILRP INDICATION SYNTAX

|  | Descriptor |
|---|---|
| video_parameter_set_rbsp( ) { |  |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) { |  |
|     vps_all_layers_same_num_sublayers_flag | u(1) |
|     [added: "vps_all_layers_same_ilrp_sublayers_flag | u(1)"] |
|     [added: "if ( vps_all_layers_same_ilrp_sublayers_flag )"] |  |
|       [added: "vps_default_max_tid_il_ref_pics_plus1 | u(3)"] |
|   } |  |
|   if( vps_max_layers_minus1 > 0 ) |  |
|     vps_all_independent_layers_flag | u(1) |
|   for( i = 0; i <= vps_max_layers_minus1; i++ ) { |  |
|     vps_layer_id[ i ] | u(6) |
|     if( i > 0 && !vps_all_independent_layers_flag ) { |  |
|       vps_independent_layer_flag[ i ] | u(1) |
|       if( !vps_independent_layer_flag[ i ] ) { |  |
|         for( j = 0; j < i; j++ ) |  |
|           vps_direct_ref_layer_flag[ i ][ j ] | u(1) |
|         [added: "if( !vps_all_layers_same_ilrp_sublayers_flag ) {"] |  |
|           max_tid_ref_present_flag[ i ] | u(1) |
|           if( max_tid_ref_present_flag[ i ] ) |  |
|             max_tid_il_ref_pics_plus1[ i ] | u(3) |
|         } |  |
|       } |  |
|     } |  |
|   } |  |
|   ... |  |
| } |  |

The semantics of the introduced vps_all_layers_same_ilrp_sublayers_flag and vps_default_max_tid_il_ref_pics_plus1 syntax elements may be as follows:

vps_all_layers_same_ilrp_sublayers_flag equal to 1 specifies that the syntax element vps_default_max_tid_il_ref_pics_plus1 is present. vps_all_layers_same_ilrp_sublayers_flag equal to 0 specifies that the syntax element vps_default_max_tid_il_ref_pics_plus1 is not present.

vps_default_max_tid_il_ref_pics_plus1 equal to 0 specifies that inter-layer prediction is not used by non-TRAP (or non-CLVSS as another alternative) of the i-th layer. vps_default_max_tid_il_ref_pics_plus1 greater than 0 specifies that pictures with TemporalId greater than vps_default_max_tid_il_ref_pics_plus1 are not used as ILRP. When not present, the value of vps_default_max_tid_il_ref_pics_plus1 is inferred to be equal to 7.

Semantics of the syntax elements of the VPS of existing VVC may be modified as shown below using [added: "added text"] to represent added text relative to existing VVC.

max_tid_il_ref_pics_plus1[i] equal to 0 specifies that inter-layer prediction is not used by non-IRAP (or non-CLVSS as another alternative) pictures of the i-th layer. max_tid_il_ref_pics_plus1[i] greater than 0 specifies that, for decoding pictures of the i-th layer, no picture with TemporalId greater than max_tid_il_ref_pics_plus1[i]−1 is used as ILRP. [added: "When max_tid_il_ref_pics_plus1 is not present, and when vps_all_layers_same_ilrp_sublayers_flag is equal to 1, the value of max_tid_il_ref_pics_plus1[i] is inferred to be equal to vps_default_max_tid_il_ref_pics_plus1, otherwise, the value of max_tid_il_ref_pics_plus1[i] is inferred to be equal to 7."] In the alternative semantics expression, [added: "When max_tid_il_ref_pics_plus1[i] is not present, the value of max_tid_il_ref_pics_plus1 is inferred to be equal to vps_default_max_tid_il_ref_pics_plus1."]

In another example, the indication of sublayer ILRP usage may only be signaled for the output layer, as shown in Table 9 below:

TABLE 9

ILRP USAGE INDICATION SYNTAX

|  | Descriptor |
|---|---|
| video_parameter_set_rbsp( ) { |  |
|   vps_video_parameter_set_id | u(4) |
|   ... |  |
|   for( i = 1; i <= vps_max_layers_minus1; i++ ) |  |
|     if ( !vps_independent_layer_flag[ i ] && LayerUsedAsOutputLayer[ i ] ) |  |
|       max_tid_ref_present_flag[ i ] | u(1) |
|       if( max_tid_ref_present_flag[ i ] ) |  |

TABLE 9-continued

ILRP USAGE INDICATION SYNTAX

| | Descriptor |
|---|---|
| max_tid_il_ref_pics_plus1[ i ] | u(3) |
| } | |
| ... | |
| } | |

Semantics of max_tid_ref_present_flag[i] and max_tid_il_ref_pics_plus1[i] may be as follows:

max_tid_ref_present_flag[i] equal to 1 specifies that the syntax element max_tid_il_ref_pics_plus1[i] is present. max_tid_ref_present_flag[i] equal to 0 specifies that the syntax element max_tid_il_ref_pics_plus1[i] is not present. When max_tid_ref_present_flag[i] is not present, the value of max_tid_ref_present_flag[i] is inferred to be equal to 0. max_tid_il_ref_pics_plus1[i] equal to 0 specifies that inter-layer prediction is not used by non-IRAP (or non-CLVSS as another alternative) pictures of the i-th layer. max_tid_il_ref_pics_plus1[i][j] greater than 0 specifies that, for decoding pictures of the i-th layer, no picture with TemporalId greater than max_tid_il_ref_pics_plus1[i][j]−1 is used as ILRP. When not present, the value of max_tid_il_ref_pics_plus1[i][j] is inferred to be equal to 7.

Thus, video encoder 200 and video decoder 300 may be configured to code values for any or all of the syntax elements of Tables 8 and/or 9, either or both of which may be combined with the syntax elements of Table 7, as discussed above.

Video encoder 200 and video decoder 300 may also be configured to code data representative of output layer sets (OLS). VVC specifies that the 0-th OLS contains only the lowest layer, and for the 0-th OLS, the only included layer is output. There may be multiple non-base independent layers available in the bitstream. This disclosure recognizes that it may be beneficial to allocate independent non-base layers into an OLS besides to 0-th OLS.

Video decoder 300 may derive the number of independent layers, NumIndependentLayers, from VPS layer dependency signaling, as follows (e.g., according to the following algorithmic pseudocode):

```
if ( vps_all_independent_layers_flag )
   NumIndependentLayers = vps_max_layers_minus1 + 1
else {
   k = 0
   VpsIndependentLayerId[ k++ ] = vps_layer_id[ 0 ]
   for( i = 1; i <= vps_max_layers_minus1; i++ ) {
      for( j = 0; j < i; j++ )
         if ( dependencyFlag[ i ][ j ] ) break;
      if ( i == j )
         VpsIndependentLayerId[ k++ ] = vps_layer_id[ i ]
   }
   NumIndependentLayers = k
}
```

The first NumIndependentLayers output layer sets contains the independent layers and in each OLS the only included layer is output.

The variable TotalNumOlss, specifying the total number of OLSs specified by the VPS, may be derived as follows:

```
if( vps_max_layers_minus1 = = 0 )
   TotalNumOlss = 1
else if( each_layer_is_an_ols_flag | | ols_mode_idc = = 0 | | ols_mode_idc
= = 1 )
   TotalNumOlss = vps_max_layers_minus1 + 1
else if( ols_mode_idc = = 2 )
   TotalNumOlss = NumIndependentLayers +
num_output_layer_sets_minus1 + 1
```

In some examples, the 0-th OLS may contain all independent layers.

Video encoder 200 and video decoder 300 may derive the variable NumLayersInOls[i], specifying the number of layers in the i-th OLS, and the variable LayerIdInOls[i][j], specifying the nuh_layer_id value of the j-th layer in the i-th OLS, as follows:

```
NumLayersInOls[ 0 ] = NumIndependentLayers
for( i = 0; i < NumIndependentLayers; i++ )
   LayerIdInOls[ 0 ][ i ] = VpsIndependentLayerId [ i ]
for( i = 1; i < TotalNumOlss; i++ ) {
   if( each_layer_is_an_ols_flag) {
      NumLayersInOls[ i ] = 1
      LayerIdInOls[ i ][ 0 ] = vps_layer_id[ i ]
   } else if( ols_mode_idc = = 0 | | ols_mode_idc = = 1 ) {
      NumLayersInOls[ i ] = i + 1
      for( j = 0; j < NumLayersInOls[ i ]; j++ )
         LayerIdInOls[ i ][ j ] = vps_layer_id[ j ]
   } else if( ols_mode_idc = = 2 ) {
      for( k = 0, j = 0; k <= vps_max_layers_minus1; k++ )
         if( layerIncludedInOlsFlag[ i ][ k ] )
            LayerIdInOls[ i ][ j++ ] = vps_layer_id[ k ]
      NumLayersInOls[ i ] = j
   }
}
```

In other words, video encoder 200 and video decoder 300 may determine a number of total OLSs as follows: when a maximum number of layers for the VPS minus 1 is equal to zero, the total number of OLSs is equal to 1; when at least one of 1) each of the layers for the VPS is an OLS, 2) an OLS mode indicator value is equal to 0, or 3) the OLS mode indicator value is equal to 1, the total number of OLSs is equal to the maximum number of layers for the VPS; or when the OLS mode indicator value is equal to 2, the total number of OLSs is equal to a number of independent layers plus a value for a syntax element of the VPS indicating a number of OLSs.

Video encoder 200 and video decoder 300 may be configured according to the following condition on profile/tier/level (PTL) and decoded picture buffer (DPB) index signaling. In this example, ols_ptl_idx[i] specifies the index to the list of profile_tier_level( ) syntax structures in the VPS, of the profile_tier_level( ) syntax structure that applies to the i-th OLS. When the number of profile_tier_level( ) syntax structures is equal to the TotalNumOlss, ols_ptl_idx[i] can be derived accordingly without explicitly signaling in VPS. In this example, ols_dpb_params_idx[i] specifies the index to the list of dpb_parameters( ) syntax structures in the VPS, of the dpb_parameters( ) syntax structure that applies to the i-th OLS. When the number of dpb_parameters( ) syntax structures is equal to TotalNumOlss, ols_dpb_params_idx[i] can be derived accordingly without explicitly signaling in VPS.

Table 10 shows an example condition for signaling ols_ptl_idx[i] and ols_dpb_params_idx[i]. In general, when the number of the profile_tier_level( ) syntax structures in the VPS is equal to the number of OLSs, i.e., that one profile_tier_level( ) syntax structures corresponds to each OLS, there is no need to send an index ols_ptl_idx to indicate which profile_tier_level( ) syntax structures to use. In this case, video decoder 300 may infer that the index ols_ptl_idx is equal to the OLS index, in some examples.

TABLE 10

VPS INCLUDING EXAMPLE CONDITION
ON PTL AND DPB INDEX SIGNALING

| | Descriptor |
|---|---|
| video_parameter_set_rbsp( ) { | |
|   vps_video_parameter_set_id | u(4) |
|   ... | |
|   for( I = 0; i <= vps_num_ptls_minus1; i++ ) | |
|     profile_tier_level( pt_present_flag[ i ], ptl_max_temporal_id[ i ] ) | |
|   [added: "if( vps_num_ptls_minus1 + 1 != TotalNumOlss && vps_num_ptls_minus1 > 0 )"] | |
|     for( i = 0; i < TotalNumOlss; i++ ) | |
|       [added: "if(NumLayersInOls[ i ] > 1)"] | |
|         ols_ptl_idx[ i ] | u(8) |
|   ... | |
|   for( i = 0; i < vps_num_dpb_params; i++ ) { | |
|     if( vps_max_sublayers_minus1 > 0 && !vps_all_layers_same_num_sublayers_flag ) | |
|       dpb_max_temporal_id[ i ] | u(3) |
|     dpb_parameters( dpb_max_temporal_id[ i ], vps_sublayer_dpb_params_present_flag ) | |
|   } | |
|   for( i = 0; i < TotalNumOlss; i++ ) { | |
|     if( NumLayersInOls[ i ] > 1 ) { | |
|       ols_dpb_pic_width[ i ] | ue(v) |
|       ols_dpb_pic_height[ i ] | ue(v) |
|       [added: "if( vps_num_dpb_params != TotalNumOlss && vps_num_dpb_params > 1 )"] | |
|         ols_dpb_params_idx[ i ] | ue(v) |
|   } | |
|   ... | |
|   rbsp_trailing_bits( ) | |
| } | |

The semantics of the syntax elements impacted by this example condition may be modified as shown below, relative to the existing VVC proposal:

ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] shall be in the range of 0 to vps_num_ptls_minus1, inclusive. [added: "When ols_ptl_idx[i] is not present, the value of ols_ptl_idx[i] is inferred as follows: if the value of vps_num_ptls_minus1+1 is equal to TotalNumOlss), the value of ols_ptl_idx[i] is inferred to be equal to i; otherwise,"] when vps_num_ptls_minus1 is equal to 0, the value of ols_ptl_idx[i] is inferred to be equal to 0.

When NumLayersInOls[i] is equal to 1, the profile_tier_level( ) syntax structure that applies to the i-th OLS is also present in the SPS referred to by the layer in the i-th OLS. It is a requirement of bitstream conformance that, when NumLayersInOls[i] is equal to 1, the profile_tier_level( ) syntax structures signalled in the VPS and in the SPS for the i-th OLS shall be identical.

ols_dpb_params_idx[i] specifies the index, to the list of dpb_parameters( ) syntax structures in the VPS, of the dpb_parameters( ) syntax structure that applies to the i-th OLS when NumLayersInOls[i] is greater than 1. When present, the value of ols_dpb_params_idx[i] shall be in the range of 0 to vps_num_dpb_params−1, inclusive. [added: "When ols_dpb_params_idx[i] is not present the value of ols_dpb_params_idx[i] is inferred as follows: if the value of vps_num_dpb_params is equal to TotalNumOlss, the value of ols_dpb_params_idx[i] is inferred to be equal to i. Otherwise,"] when ols_dpb_params_idx[i] is not present, the value of ols_dpb_params_idx[i] is inferred to be equal to 0.

When NumLayersInOls[i] is equal to 1, the dpb_parameters( ) syntax structure that applies to the i-th OLS is present in the SPS referred to by the layer in the i-th OLS. [added: "It is a requirement of bitstream conformance that, when NumLayersInOls[i] is equal to 1, the dpb_parameters( ) syntax structures signalled in the VPS and in the SPS for the i-th OLS shall be identical."]

In this manner, video encoder 200 and video decoder 300 may code values for syntax elements according to the example syntax and semantics of Table 10 above, which may be combined with any or all of the syntax and semantics of the examples of Tables 7-9 above. Furthermore, it should be understood that the DCI SEI message techniques of Table 6 may be used alone or in any combination with the example VPSs of Tables 7-10 above.

In some examples, according to the example of Table 10 and the discussion above, video encoder 200 may be configured to determine that a number of PTL data structures in a VPS is equal to a total number of OLSs specified for the VPS. In this scenario, a syntax element representing the number of PTL data structures in the VPS would be equal to the total number of OLSs specified for the VPS. In response, video encoder 200 may avoid encoding values for OLS PTL index values in the VPS. Video encoder 200 may also ensure that video data of the OLSs conform to profile, tier, and level values of the PTL data structures having indexes that match the OLSs in order. That is, video encoder 200 may ensure that the video data of an $i^{th}$ OLS of the OLSs are encoded according to coding tools of an $i^{th}$ PTL data structure for all values of i from 0 to the number of OLSs.

Similarly, video decoder 300 may determine that a value of a syntax element indicating the number of PTL data structures of a VPS (e.g., vps_num_ptls_minus1) is equal to the total number of OLSs specified for the VPS. In response, video decoder 300 may infer values for indexes that specify correspondences between the OLSs and the PTL data structures (e.g., ols_ptl_idx[i]). In particular, as discussed above, video decoder 300 may infer values of the indexes as corresponding to the order in which the indexes would occur, i.e., ols_ptl_idx[i]=i. In this manner, video decoder 300 may determine that the $i^{th}$ PTL data structure is to be used when decoding video data of the $i^{th}$ OLS for all values of i between 0 and the total number of OLSs.

Video encoder 200 and video decoder 300, additionally or alternatively, may be configured to prevent SPS emulation in certain circumstances. Table 11 below shows a partial set of SPS syntax elements. According to VVC, the values of syntax elements from sps_seq_parameter_set_id to res_change_in_clvs_allowed_flag in Table 11 may all be equal 0, which may result in emulating the start code, depending on the value of pic_width_max_in_luma_samples.

TABLE 11

SPS RBSP SYNTAX

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   ... | |
| } | |

VVC specifies a start code prefix as the hexadecimal value 0x000001. VVC indicates that the start code prefix is a prefix to a NAL unit, thereby signaling that a new NAL unit is about to occur. Thus, per the existing structure of VVC as shown in Table 11, if each of the syntax elements from sps_seq_parameter_set_id to res_change_in_clvs_allowed_flag has a value of 0, and the subsequent bit is a 1, the start code prefix would be emulated, which could cause an error in processing by video decoder 300.

Video encoder 200 and video decoder 300 may be configured to prevent such emulation according to any or all of the following example techniques, alone or in any combination:

Require that all the syntax elements that contribute to emulating the start code (i.e., currently all have 0 values) cannot be all equal to 0. In this case, at least one syntax element is required to have a non-zero value, which prevents the start code emulation from happening. Similar method can be applied to any parameter set or header.

Change sps_max_sublayers_minus1 to sps_max_sublayers so that the value of sps_max_sublayers shall be in the range of 1 to vps_max_sublayers_minus1+1.

Change sps_reserved_zero_4bits to sps_reserved_one_4bits and the value of sps_reserved_one_4bits shall be equal to '1111' (0xF).

In this manner, the semantics of these syntax elements of the SPS can be defined in such a way that video encoder 200 and video decoder 300 need not code an emulation prevention byte in the SPS. By avoiding coding the emulation prevention byte, video encoder 200 and video decoder 300 may avoid excess processing operations, and the video bitstream need not include this overhead data.

In some examples, video encoder 200 and video decoder 300 may be configured according to a bitstream conformance requirement on PPS conformance window syntax elements, e.g., as discussed below. Modifications to the specification of VVC are represented using [added: "added text"] below.

When pic_width_in_luma_samples is equal to pic_width_max_in_luma_samples and pic_height_in_luma_samples is equal to pic_height_max_in_luma_samples, [added: "it is a requirement of bitstream conformance that pps_conformance_window_flag is equal to 0."]

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. [added: "When pps_conformance_window_flag is equal to 0, the values of pps_conf_win_left_offset, pps_conf_win_right_offset, pps_conf_win_top_offset, and pps_conf_win_bottom_offset are inferred to be equal to sps_conf_win_left_offset, sps_conf_win_right_offset, sps_conf_win_top_offset, and sps_conf_win_bottom_offset, respectively."]

As such, video encoder 200 and video decoder 300 may be configured to, in response to determining that a value for a syntax element representing a picture width in a picture parameter set (PPS) of the bitstream (e.g., pic_width_in_luma_samples) is a maximum picture width value (e.g., pic_width_max_in_luma_samples) and that a value for a syntax element representing a picture height in the PPS (e.g., pic_height_in_luma_sampl) is a maximum picture height value (e.g., pic_height_max_in_luma_samples), determine that a conformance window value is equal to zero (i.e., that conformance window syntax elements of the PPS are not explicitly signaled). Additionally or alternatively, video encoder 200 and video decoder 300 may be configured to, in response to determining that a conformance window value in a PPS is equal to zero (i.e., that conformance window syntax elements of the PPS are not explicitly signaled), infer values of conformance window offsets for the PPS as being equal to corresponding values of conformance window offsets for an SPS.

Additionally, pic_width_in_luma_samples and pic_height_in_luma_samples may be signaled as being equal to a default value, for example 0, when they are equal to pic_width_max_in_luma_samples and pic_height_max_in_luma_samples, respectively. Then if pic_width_in_luma_samples or pic_height_in_luma_samples is equal to the default value, the value of pic_width_in_luma_samples or pic_height_in_luma_samples may be replaced with the value of pic_width_max_in_luma_samples and pic_height_max_in_luma_samples, respectively.

In an alternative solution, video encoder 200 and video decoder 300 may code a value for a gating flag, pic_size_present_flag. Video encoder 200 and video decoder 300 may code pic_width_in_luma_samples and pic_height_in_luma_samples only when the value of pic_size_present_flag is equal to 1. Then, the inference rule may be added, where video encoder 200 and video decoder 300 may, when pic_width_in_luma_samples and pic_height_in_luma_samples are not present, infer the values to be equal to pic_width_max_in_luma_samples and pic_height_max_in_luma_samples, respectively. This approach may save signaling overhead for pic_width_in_luma_samples and pic_height_in_luma_samples when they are equal to pic_width_max_in_luma_samples and pic_height_max_in_luma_samples, respectively, which may be a typical coding case.

In another example, video encoder 200 and video decoder 300 may code a value for a PPS syntax element, e.g., pps_res_change_allowed_flag as shown in the example of Table 12 below, to indicate if picture resolution may change or not for pictures referring to the PPS. The syntax element (e.g., flag) can be used to condition the presence of PPS picture resolution, PPS conformance window, and PPS scaling window syntax elements. Video decoder 300 may infer the values of these syntax elements from the corresponding SPS synatx elements when not present.

TABLE 12

Example PPS Syntax Structure

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   [added: "pps_res_change_allowed_flag | u(1)"] |
|   [added: "if( pps_res_change_allowed_flag ) {"] | |
|     pic_width_in_luma_samples | ue(v) |
|     pic_height_in_luma_samples | ue(v) |
|     pps_conformance_window_flag | u(1) |
|     if( pps_conformance_window_flag ) { | |
|       pps_conf_win_left_offset | ue(v) |
|       pps_conf_win_right_offset | ue(v) |
|       pps_conf_win_top_offset | ue(v) |
|       pps_conf_win_bottom_offset | ue(v) |
|     } | |
|     if( scaling_window_explicit_signalling_flag ) { | |
|       scaling_win_left_offset | |
|       scaling_win_right_offset | |
|       scaling_win_top_offset | |
|       scaling_win_bottom_offset | |
|     } | |
|   [added: "}"] | |
|   ... | |
| } | |

The semantics for the pps_res_change_allowed_flag syntax element in the example of Table 12 above may be as follows:

pps_res_change_allowed_flag equal to 1 specifies that the picture spatial resolution may change on the picture referring to the PPS. pps_res_change_allowed_flag equal to 0 specifies that the picture spatial resolution does not change on the picture referring to the PPS. When the value of res_change_in_clvs_allowed_flag is equal to 0, the value of pps_res_change_allowed_flag shall be equal to 0.

Semantics for other syntax elements of Table 12 may be modified as follows:

pps_conformance_window_flag equal to 1 indicates that the conformance cropping window offset parameters follow next in the PPS. pps_conformance_window_flag equal to 0 indicates that the conformance cropping window offset parameters are not present in the PPS. [added: "When not present, the value of pps_conformance_window_flag is inferred to be equal to 0."]

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. [added: "When not present, the value of scaling_window_explicit_signalling_flag is inferred to be equal to 0."]

According to VVC, the value of sps_poc_msb_flag indicates whether a value for the ph_poc_msb_present_flag syntax element is present in picture headers (PHs) referring to the SPS. When sps_poc_msb_flag is equal to 1, VVC indicates that another syntax element, poc_msb_len_minus1, is signalled in the SPS to indicate the length of the poc_msb_val syntax elements in the PHs referring to the SPS. Converging two syntax elements into one may simplify the SPS syntax design. Table 13 below shows example syntax element changes. In this example, the syntax element poc_msb_len replaces sps_poc_msg_flag and poc_msb_len_ minus1. In Table 13, [removed: "removed text"] signifies text removed from VVC, while [added: "added text"] signifies added text to VVC.

TABLE 13

EXAMPLE POC MSB SYNTAX ELEMENT IN SPS

| | Descriptor |
|---|---|
| seq_parameter_set_rbsp( ) { | |
|   sps_seq_parameter_set_id | u(4) |
|   ... | |
|   log2_max_pic_order_cnt_lsb_minus4 | u(4) |
|   [removed: "sps_poc_msb_flag | u(1)"] |
|   [removed: "if( sps_poc_msb_flag )"] | |
|     [removed: "poc_msb_len_minus1 | ue(v)"] |
|   [added: "poc_msb_len | ue(v)"] |
|   ... | |
| } | |

Semantics of the poc_msb_len syntax element may be defined as follows: poc_msb_len specifies the length, in bits, of the poc_msb_val syntax elements, when present in the PHs referring to the SPS. The value of poc_msb_len shall be in the range of 0 to 32−log 2_max_pic_order_cnt_lsb_minus4−4, inclusive. When poc_msb_len is equal to 0, the ph_poc_msb_present_flag and poc_msb_val syntax elements are not present in the PHs referring to the SPS.

Table 14 below represents example changes in the picture header (PH) corresponding to the example changes of Table 13:

TABLE 14

PH POC MSB SYNTAX

| | Descriptor |
|---|---|
| picture_header_structure( ) { | |
|   gdr_or_irap_pic_flag | u(1) |
|   ... | |
|   [added: "if( sps_poc_len ) {"] | |
|     ph_poc_msb_present_flag | u(1) |
|     if( ph_poc_msb_present_flag ) | |
|       poc_msb_val | u(v) |
|   } | |
|   ... | |
| } | |

Semantics for poc_msb_val in Table 14 may be defined as follows, with updates relative to VVC: poc_msb_val specifies the POC MSB value of the current picture. [added: "The length of the syntax element poc_msb_val is poc_msb_len bits."]

In a similar way, alf_luma_coeff_abs and alf_luma_coeff sign syntax elements signaled in an adaptation parameter set (APS) can be converted to a single syntax element alf_luma_coeff signaled with a binarization code, which has a sign, for example, signed Exponential Golomb code, for example, se(v). For example, a syntax element alf_luma_coeff[sfIdx][j] with descriptor se(v) may replace alf_luma_coeff_abs [sfidx][j] and alf_luma_coeff_sign[sfIdx][j].

Accordingly, video encoder 200 and video decoder 300 may code values for the syntax elements of Tables 12 and 13 according to the techniques discussed above. Video encoder 200 and video decoder 300 may perform these techniques alone or in any combination with the techniques of Tables 6-11 as discussed above.

This disclosure recognizes that problems may occur during derivation of a slice height within a tile when the value of the variable NumSlicesInTile[i] is derived to be equal to 1 when num_exp_slices_in_tile[i] is equal to 0 or 1. Video encoder 200 and video decoder 300 may be configured according to the example changes to VVC discussed below, where [removed: "removed text"] signifies removed text and [added: "added text"] signifies added text.

num_exp_slices_in_tile[i] specifies the number of explicitly provided slice heights in the current tile that contains more than one rectangular slices. The value of num_exp_slices_in_tile[i] shall be in the range of [removed: "0"] [added: "1"] to RowHeight[tileY] [removed: "−1"], inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to [removed: "1"] [added: "0"].

exp_slice_height_in_ctus_minus1[j] plus 1 specifies the height of the j-th rectangular slice in the current tile in units of CTU rows. The value of exp_slice_height_in_ctus_minus1[j] shall be in the range of 0 to RowHeight[tileY]−1, inclusive, where tileY is the tile row index of the current tile.

When num_exp_slices_in_tile[i] is greater than 0, the variable NumSlicesInTile[i] [added: "for i in the range of 1 to NumSlicesInTile[i]"] and SliceHeightInCtusMinus1[i+k] for k in the range of 0 to NumSlicesInTile[i]−1 are derived as follows:

```
remainingHeightInCtbsY =
RowHeight[ SliceTopLeftTileIdx[ i ] / NumTileColumns ]
numExpSliceInTile = num_exp_slices_in_tile[ i ]
for( j = 0; j < numExpSliceInTile; j++ ) {
   SliceHeightInCtusMinus1[ i++ ] =
   exp_slice_height_in_ctu_minus1[ j ]
   remainingHeightInCtbsY −= SliceHeightInCtusMinus1[ j ]
}
uniformSliceHeightMinus1 = SliceHeightInCtusMinus1[ i − 1 ]
while( remainingHeightInCtbsY >= (uniformSliceHeightMinus1 + 1) ) {
   SliceHeightInCtusMinus1[ i++ ] = uniformSliceHeightMinus1
   remainingHeightInCtbsY −= (uniformSliceHeightMinus1 + 1)
   j++
}
if( remainingHeightInCtbsY > 0 ) {
   SliceHeightInCtusMinus1[ i++ ] = remainingHeightInCtbsY
   j++
}
NumSlicesInTile[ i ] = j
```

Figure 2A:
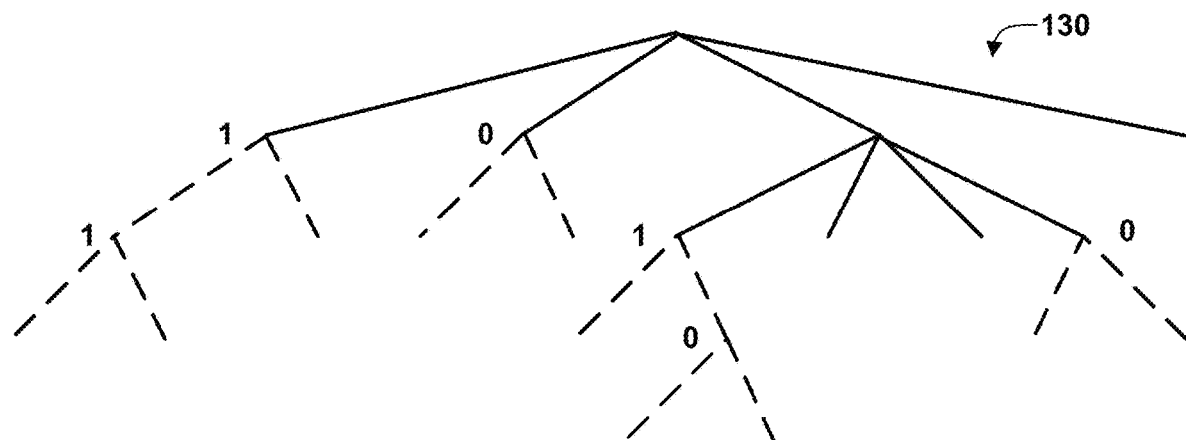
FIGS. 2A and 2B are conceptual diagrams illustrating an example quadtree binary tree (QTBT) structure, and a corresponding coding tree unit (CTU).
Figure 2B:
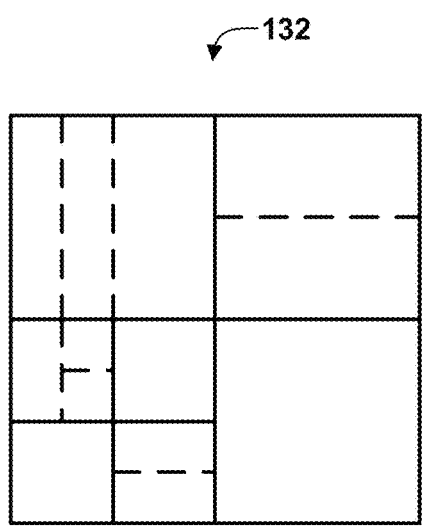

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
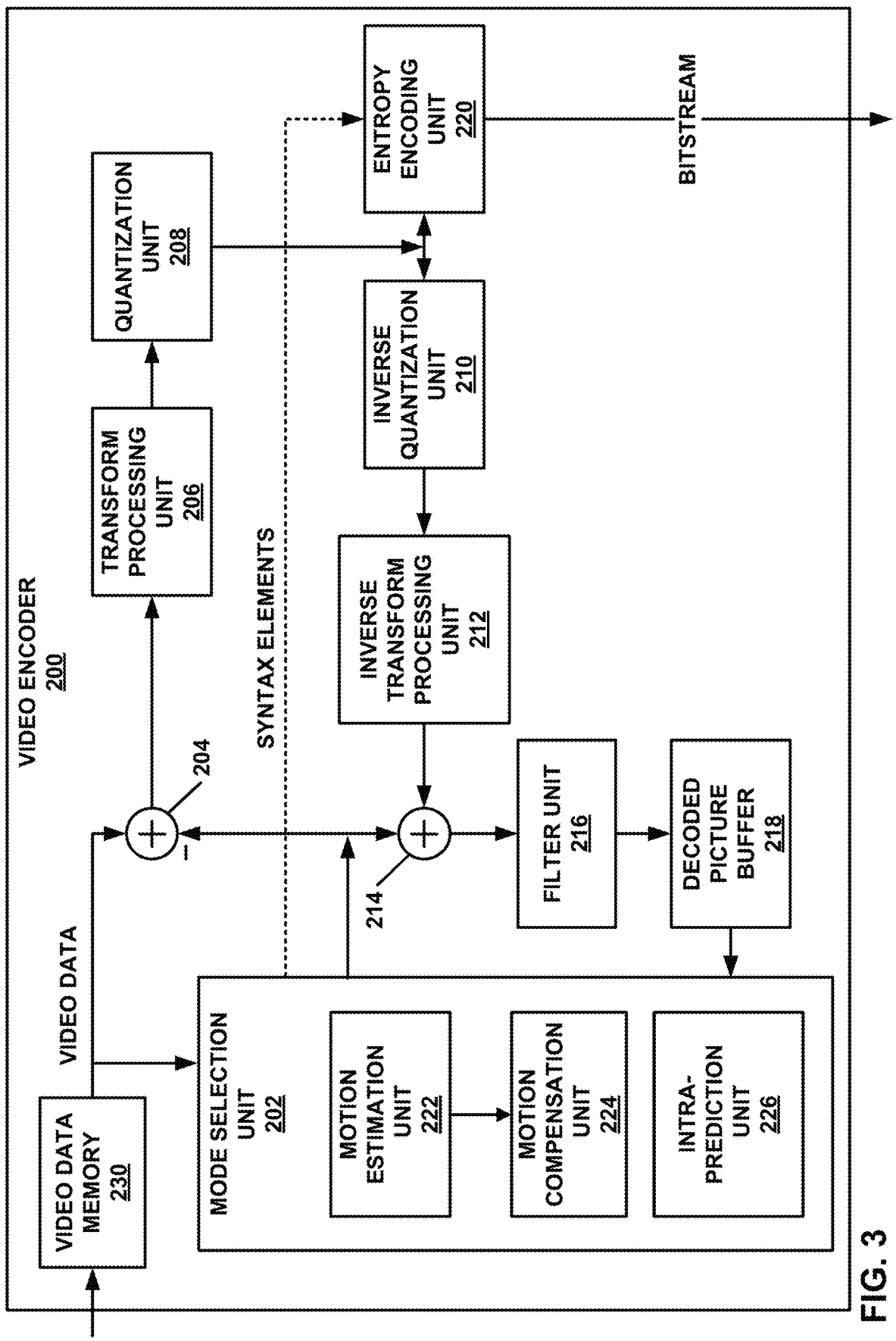
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to other video encoding and decoding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

In some examples, mode selection unit 202 may be configured to automatically determine coding tools to enable and/or disable for one or more OLSs. For example, mode selection unit 202 may perform rate-distortion optimization (RDO) to calculate rate-distortion (RD) values for each OLS and various combinations of enabled/disabled coding tools, and then select the set of coding tools that yields the best RD value for the OLS. Alternatively, an administrator or other user may enable and/or disable coding tools for a given OLS (i.e., any or all of the OLSs). In any case, mode selection unit 202 may determine appropriate profile, tier, and level values for each OLS of a total number of OLSs of a video bitstream.

According to the techniques of this disclosure, mode selection unit 202 may further signal PTL data structures for the OLSs. Mode selection unit 202 may also determine a number of the PTL data structures to be signaled for the OLSs and signal a value for the number in a VPS. When the number of PTL data structures in the VPS is equal to the total number of OLSs specified for the VPS, mode selection unit 202 may cause video encoder 200 to avoid encoding values for OLS PTL index values. Instead, mode selection unit 202 may cause entropy encoding unit 220 to encode the PTL data structures in the VPS in the same order as the OLSs, such that the correspondences between PTL data structures and OLSs can be inferred from the signaling order.

Furthermore, additionally or alternatively, mode selection unit 202 may determine, using RDO techniques, picture sizes for pictures in a sequence of pictures. Alternatively, mode selection unit 202 may receive configuration data from a user, such as an administrator, representing the pictures sizes to be used. In examples where mode selection unit 202 determines that the pictures have maximum picture sizes, mode selection unit 202 may case entropy encoding unit 220 to generate picture parameter sets (PPSs) for the pictures that do not include conformance window syntax elements. In some examples, mode selection unit 202 may cause entropy encoding unit 220 to encode a PPS to include a conformance window flag having a value indicating that the other conformance window syntax elements (e.g., offset values) are not signaled. In such cases, the values of the conformance window syntax elements of the PPS may be inferred from corresponding values of a sequence parameter set (SPS).

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a video coder that may be configured to perform the techniques described with respect to any of Tables 7-13 above.

Figure 4:
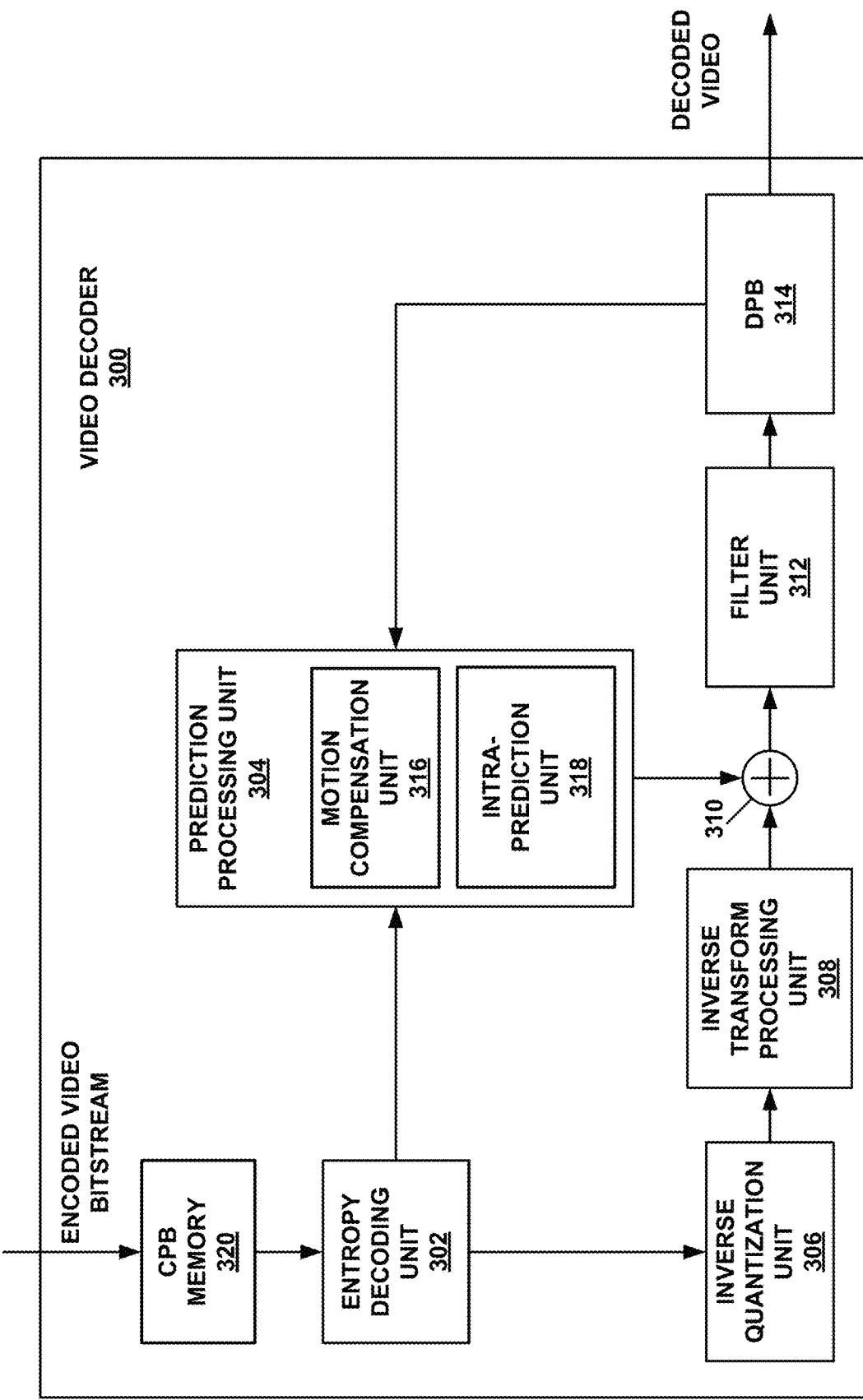
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Video decoder 300 may initially process (e.g., decode, parse, and/or interpret) high level syntax data structures, such as video parameter sets (VPSs), sequence parameter sets (SPSs), and picture parameter sets (PPSs). For example, video decoder 300 may determine profile, tier, and level (PTL) values for output layer sets (OLSs) of a bitstream using data of a VPS. In accordance with the techniques of this disclosure, video decoder 300 may determine a number of PTL data strictures in the VPS, e.g., using a value of vps_num_ptls_minus1. Video decoder 300 may also determine a total number of OLSs specified for the VPS, e.g., using the pseudocode above for calculating the value of TotalNumOlss.

Video decoder 300 may then determine whether the number PTL data structures is equal to the total number of OLSs specified for the VPS. If the number of PTL data structures is equal to the total number of OLSs specified for the VPS, video decoder 300 may determine that OLS PTL index values will not be explicitly signaled in the VPS. Instead, video decoder 300 may infer values for the OLS PTL index values. For example, video decoder 300 may determine that the $i^{th}$ PTL data structure describes PTL data for the $i^{th}$ OLS for all values of i between 0 and the total number of OLSs specified for the VPS. On the other hand, if the number of PTL data structures is not equal to the total number of OLSs, video decoder 300 may decode explicit values for the OLS PTL index values from the VPS.

Additionally or alternatively, video decoder 300 may determine whether values representing a picture size (e.g., pic_width_in_luma_samples and pic_height_in_luma_samples) of a PPS for a picture indicate that the picture has a maximum size (e.g., pic_width_in_luma_samples being equal to pic_width_max_in_luma_samples and pic_height_in_luma_samples being equal to pic_height_max_in_luma_samples). When the picture has the maximum size, video decoder 300 may determine that PPS conformance window syntax elements are not signaled. When the PPS conformance window syntax elements are not signaled (e.g., when a PPS_conformance_window_flag has an explicit or inferred value of zero), video decoder 300 may infer values for other PPS conformance window syntax elements (e.g., pps_conf_win_left_offset, pps_conf_win_right_offset, pps_conf_win_top_offset, and pps_conf_win_bottom_offset) from corresponding SPS conformance window syntax elements (e.g., sps_conf_win_left_offset, sps_conf_win_right_offset, sps_conf_win_top_offset, and sps_conf_win_bottom_offset, respectively).

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 represents an example of a video coder that may be configured to perform the techniques described with respect to any of Tables 7-13 above.

Figure 5:
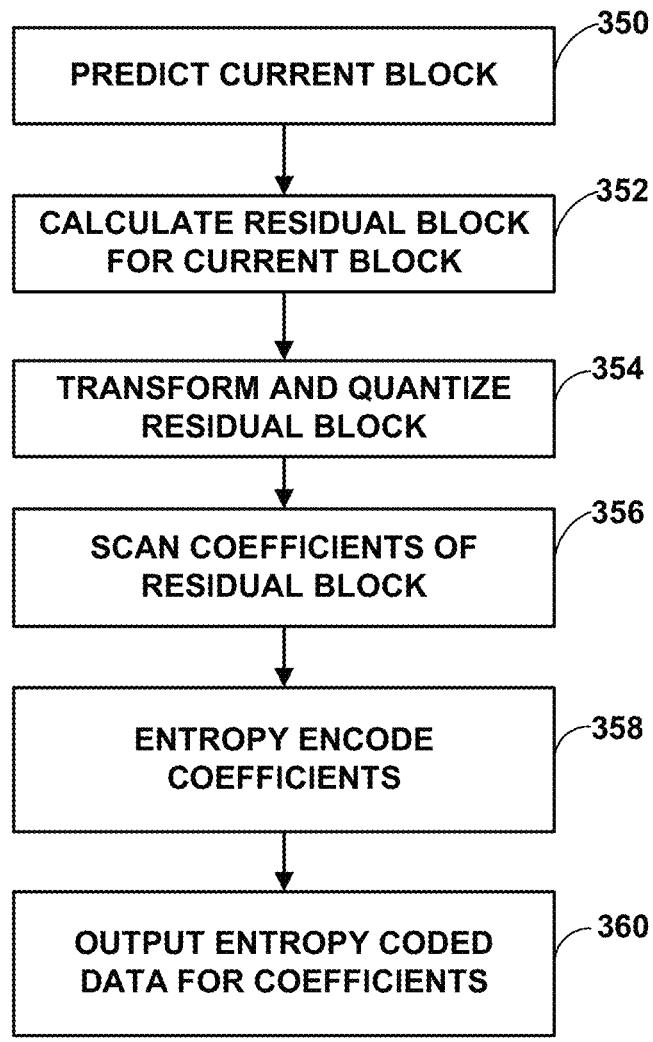
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 6:
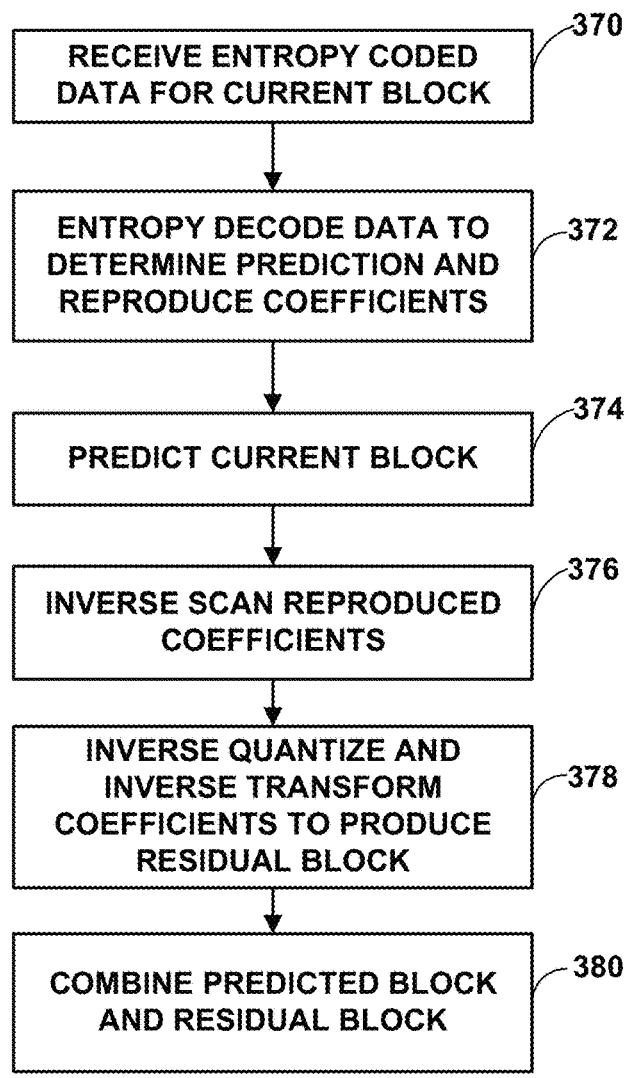
FIG. 6 is a flowchart illustrating an example method for decoding a current block in accordance with the techniques of this disclosure.

FIG. 6 is a flowchart illustrating an example method for decoding a current block in accordance with the techniques of this disclosure. The current block may comprise a current CU. Although described with respect to video decoder 300 (FIGS. 1 and 4), it should be understood that other devices may be configured to perform a method similar to that of FIG. 6.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 7:
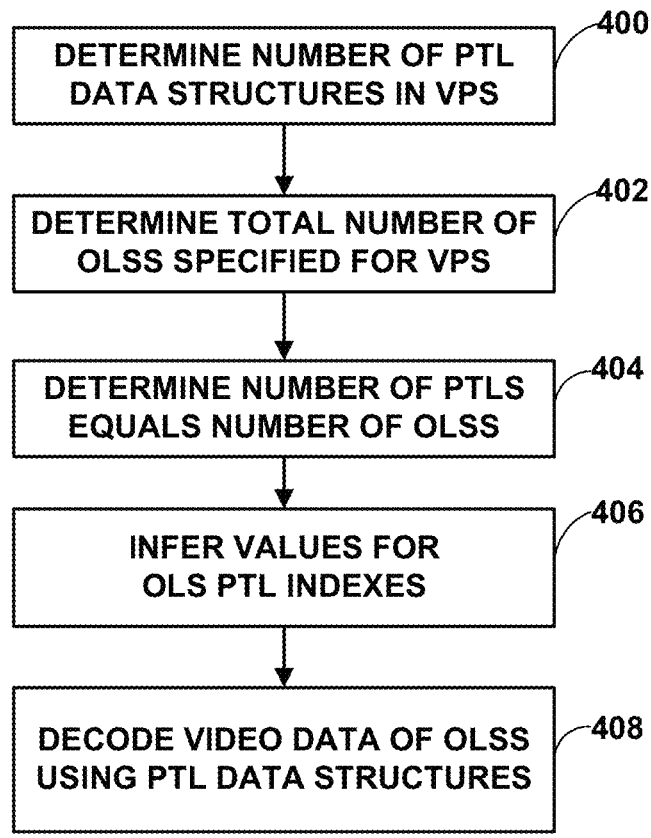
FIG. 7 is a flowchart illustrating an example method of decoding video data according to the techniques of this disclosure.

FIG. 7 is a flowchart illustrating an example method of decoding video data according to the techniques of this disclosure. Video decoder 300 may perform the method of FIG. 7 prior to performing the method of FIG. 6 discussed above. Video encoder 200 may perform a substantially similar method, albeit with reciprocal techniques in certain instances as discussed below.

Initially, video decoder 300 may receive a video parameter set (VPS). Video decoder 300 may decode data of the VPS to determine a number of PTL data structures in the VPS (400). For example, video decoder 300 may decode a value for a vps_num_ptls_minus1 syntax element of the VPS, and determine the number of PTL data structures in the VPS from the value for the vps_num_ptls_minus1 syntax element.

Video decoder 300 may also determine a total number of OLSs specified for the VPS (402). For example, as noted above, video decoder 300 may calculate a value for a variable TotalNumOlss, as follows:

--- if( vps_max_layers_minus1 = = 0 )
   TotalNumOlss = 1

-continued

```
else if( each_layer_is_an_ols_flag || ols_mode_idc = = 0 || ols_mode_idc
= = 1 )
   TotalNumOlss = vps_max_layers_minus1 + 1
else if( ols_mode_idc = = 2 )
   TotalNumOlss = NumIndependentLayers +
num_output_layer_sets_minus1 + 1
```

In other words, when a maximum number of layers for the VPS minus 1 is equal to zero, video decoder 300 may determine that the total number of OLSs is equal to 1; when at least one of 1) each of the layers for the VPS is an OLS, 2) an OLS mode indicator value is equal to 0, or 3) the OLS mode indicator value is equal to 1, video decoder 300 may determine that the total number of OLSs is equal to the maximum number of layers for the VPS; or when the OLS mode indicator value is equal to 2, video decoder 300 may determine that the total number of OLSs is equal to a number of independent layers plus a value for a syntax element of the VPS indicating a number of OLSs.

Video decoder 300 may then determine whether the number of PTL data structures is equal to the total number of OLSs specified for the VPS. In the example of FIG. 7, it is assumed that video decoder 300 determines that the number of PTL data structures is equal to the total number of OLSs specified for the VPS (404). As a result, video decoder 300 may infer values for the OLS PTL indexes (406). In particular, video decoder 300 may infer the values for the OLS PTL indexes (e.g., ols_ptl_idx[i]) without explicitly decoding values representative of the index values from the VPS. For example, video decoder 300 may determine that an $i^{th}$ OLS PTL index value of the OLS PTL index values is equal to i for all values of i between 0 and the total number of OLSs.

Video decoder 300 may further decode video data of the OLSs using the corresponding PTL data structures (408). For example, video decoder 300 may allocate an appropriate amount of memory in storage devices, initialize coding tools, and avoid initializing unused coding tools according to the PTL data structures. Video decoder 300 may then decode blocks of video data using the initialized coding tools, e.g., according to the method of FIG. 6 as discussed above.

In this manner, the method of FIG. 7 represents an example of a method of decoding video data including determining that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, inferring values for OLS PTL index values, without explicitly decoding values for the OLS PTL index values; and decoding video data of one or more of the OLSs using corresponding PTL data structures of the PTL data structures in the VPS according to the inferred values for the OLS PTL index values.

Figure 8:
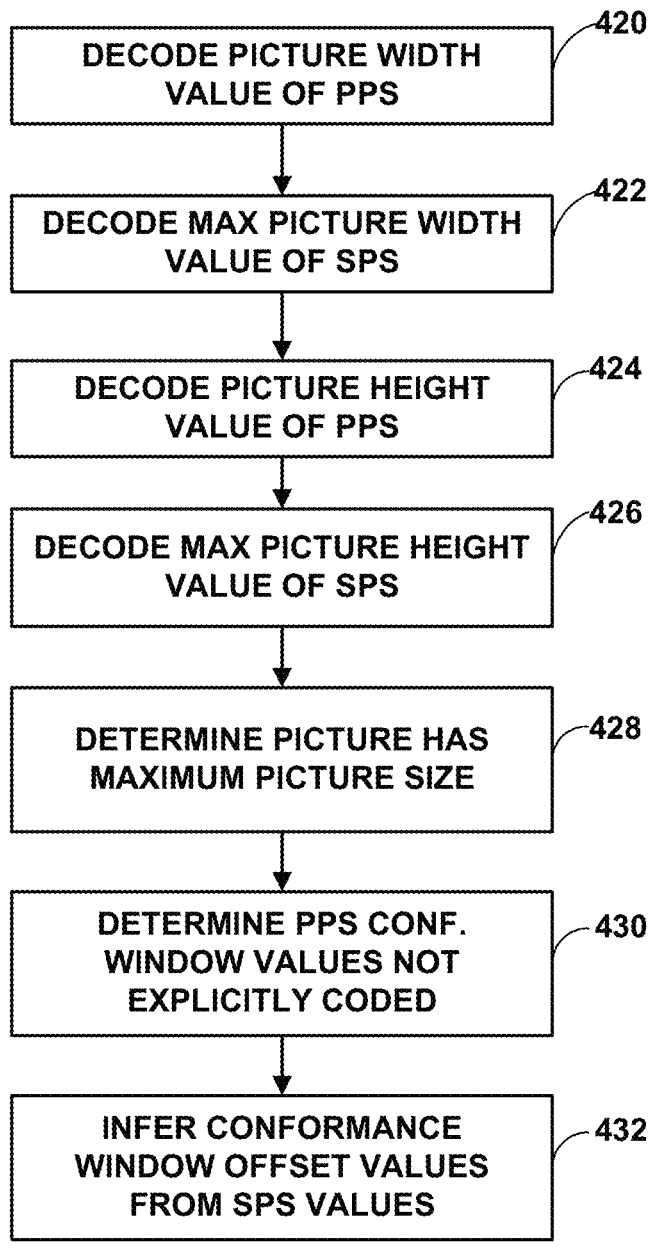
FIG. 8 is a flowchart illustrating another example method of decoding video data according to the techniques of this disclosure.

FIG. 8 is a flowchart illustrating another example method of decoding video data according to the techniques of this disclosure. Video decoder 300 may decode a picture width value of a picture parameter set (PPS) (420). The picture width value may be, for example, pic_width_in_luma_samples. Video decoder 300 may also decode a maximum picture width value of a sequence parameter set (SPS) referred to by the PPS (422). For example, the max picture width value may be pic_width_max_in_luma_samples. Likewise, video decoder 300 may decode a picture height value of the PPS (424) and a maximum picture height value of the SPS (426).

Video decoder 300 may then determine whether a picture corresponding to the PPS has a maximum picture height. For example, video decoder 300 may determine whether the picture width value is equal to the maximum picture width value and whether the picture height value is equal to the maximum picture height value. In this example, it is assumed that video decoder 300 determines that the picture has the maximum picture size (428).

As a result, video decoder 300 may determine that PPS conformance window values are not explicitly coded (430). For example, video decoder 300 may determine that a pps_conformance_window_flag of the PPS has a value of 0 (e.g., through inference or express decoding of the value). Thus, according to the techniques of this disclosure video decoder 300 may infer conformance window offset values from corresponding SPS values of the SPS (432). For example, video decoder 300 may infer values of pps_conf_win_left_offset, pps_conf_win_right_offset, pps_conf_win_top_offset, and pps_conf_win_bottom_offset of the PPS from sps_conf_win_left_offset, sps_conf_win_right_offset, sps_conf_win_top_offset, and sps_conf_win_bottom_offset, respectively, of the SPS. In particular, video decoder 300 may infer the conformance window offset values without explicitly decoding data for the values, e.g., for pps_conf_win_left_offset, pps_conf_win_right_offset, pps_conf_win_top_offset, and pps_conf_win_bottom_offset from the PPS.

In this manner, the method of FIG. 8 represents an example of a method including, in response to determining that a value for a syntax element representing a picture width in a picture parameter set (PPS) of the bitstream is a maximum picture width value and that a value for a syntax element representing a picture height in the PPS is a maximum picture height value, determining that a conformance window value is equal to zero. Furthermore, the method of FIG. 8 represents an example of a method including, in response to determining that a conformance window value in a picture parameter set (PPS) is equal to zero, inferring values of conformance window offsets for the PPS as being equal to corresponding values of conformance window offsets for a sequence parameter set (SPS).

Certain techniques of this disclosure are represented in the following clauses:

Clause 1: A method of processing video data, the method comprising: processing a decoder capability information (DCI) supplemental enhancement information (SEI) message for a video bitstream, the DCI SEI message including data indicating information representing capabilities that a video decoder must have to decode the video bitstream; and when the video decoder has the capabilities, providing the video bitstream to the video decoder.

Clause 2: The method of clause 1, wherein the information representing the capabilities comprises data indicating a maximum number of temporal sublayers that may be present in each coded video sequence (CVS) of the video bitstream.

Clause 3: The method of any of clauses 1 or 2, wherein the information representing the capabilities comprises data indicating a number of profile, tier, level syntax structures included in the DCI SEI message.

Clause 4: The method of any of clauses 1-3, wherein the information representing the capabilities comprises data indicating highest values of a general profile indicator to be supported by the video decoder.

Clause 5: The method of any of clauses 1-4, wherein the information representing the capabilities comprises data indicating highest values of a general level indicator to be supported by the video decoder.

Clause 6: A method of coding video data, the method comprising: coding a value for a syntax element indicating whether all layers in a coded video sequence (CVS) are independently coded without using inter-layer prediction, all non-base layers in the CVS use inter-layer prediction and that each layer i is a direct reference layer for layer i+1 and sublayers of all layers except a highest layer are used for inter-layer prediction, or one or more of the layers in the CVS can use inter-layer prediction; and coding pictures of the layers of the CVS according to the value for the syntax element.

Clause 7: The method of clause 6, further comprising the method of any of clauses 1-5.

Clause 8: The method of any of clauses 6 or 7, wherein the syntax element comprises a first syntax element, the method further comprising inferring a value for a second syntax element representing whether a layer uses inter-layer prediction when the second syntax element is not coded according to the value for the first syntax element.

Clause 9: The method of clause 8, wherein inferring the value for the second syntax element comprises: inferring the value for the second syntax element is 0 when the value for the first syntax element is 1; or inferring the value for the second syntax element is 1 when the value for the first syntax element is 0.

Clause 10: The method of clause 8, wherein inferring the value for the second syntax element comprises inferring the value for the second syntax element to be one minus the value for the first syntax element.

Clause 11: The method of any of clauses 8-10, wherein the second syntax element comprises vps_independent_layer_flag[i].

Clause 12: The method of any of clauses 6-11, wherein coding the value for the syntax element comprises coding the value in a video parameter set (VPS).

Clause 13: A method of coding video data, the method comprising: coding a value for a syntax element indicating whether a value indicating a default maximum temporal layer identifier for inter-layer reference pictures of video data is present in a video bitstream; and coding pictures of the video bitstream according to the value of the syntax element.

Clause 14: The method of clause 13, further comprising the method of any of clauses 1-12.

Clause 15: The method of any of clauses 13 or 14, further comprising coding a value for a syntax element indicating an actual maximum temporally layer identifier for inter-layer reference pictures when the value for the syntax element indicates that the value for the default maximum temporal layer identifier for inter-layer reference pictures is not present in the video bitstream.

Clause 16: The method of any of clauses 13-15, further comprising coding the value for the default maximum temporal layer identifier when the value for the syntax element indicates that the value for the default maximum temporal layer identifier is present in the video bitstream.

Clause 17: A method of coding video data, the method comprising: coding data indicating an output layer set for a non-base, independently coded layer of video data; and coding the video data according to the indicated output layer set.

Clause 18: The method of clause 17, further comprising the method of any of clauses 1-16.

Clause 19: A method of coding video data, the method comprising: determining that a number of output layer sets (OLSs) is equal to a number of profile, tier, level (PTL) data structures for a video bitstream; in response to determining that the number of OLSs is equal to the number of PTL data structures, inferring indices between the OLSs and the PTL data structures without coding values for the indices; and coding video data according to the inferred indices.

Clause 20: The method of clause 19, further comprising the method of any of clauses 1-18.

Clause 21: A method of coding video data, the method comprising: coding values for syntax elements of a sequence parameter set (SPS) of a video bitstream to prevent coding of an emulation prevention byte; and coding the video bitstream according to the SPS.

Clause 22: The method of clause 21, further comprising the method of any of clauses 1-20.

Clause 23: The method of any of clauses 21 or 22, wherein coding the values for the syntax elements of the SPS comprises coding a non-zero value for at least one of the syntax elements.

Clause 24: The method of any of clauses 21-23, wherein coding the values for the syntax elements of the SPS comprises coding a value for a syntax element of the SPS representing an SPS-specific maximum number of sublayers in a range from 1 to a value of a syntax element of a video parameter set (VPS) indicating a VPS-specific maximum number of sublayers.

Clause 25: The method of any of clauses 21-23, wherein coding the values for the syntax elements of the SPS comprises coding a binary value of 1111 following the first eleven bits of the SPS.

Clause 26: A method of coding video data, the method comprising: inferring values for conformance window syntax elements of a picture parameter set (PPS) from corresponding conformance window syntax elements of a sequence parameter set (SPS) without coding values for the conformance window syntax elements of the PPS for a video bitstream; and coding video data of the video bitstream according to the inferred values.

Clause 27: The method of clause 26, further comprising the method of any of clauses 1-25.

Clause 28: The method of any of clauses 26 or 27, wherein inferring the values comprises inferring the values when values for syntax elements indicating a picture size for the video bitstream indicate that the picture size is equal to a maximum possible picture size for the video bitstream.

Clause 29: The method of clause 27, further comprising coding values for syntax elements defining the maximum possible picture size.

Clause 30: A method of coding video data, the method comprising: coding a value for a syntax element of a picture parameter set (PPS) indicating whether a picture resolution of pictures referring to the PPS can change; when the value for the syntax element indicates that the picture resolution cannot change, inferring values of syntax elements of the PPS defining the picture resolution of the pictures referring to the PPS from corresponding values of syntax elements of a corresponding sequence parameter set (SPS) without coding values for the syntax elements of the PPS; and coding the pictures referring to the PPS according to the values of the syntax elements of the PPS.

Clause 31: The method of clause 30, further comprising the method of any of clauses 1-29.

Clause 32: The method of any of clauses 30 and 31, wherein the syntax element of the PPS comprises pps_res_change_allowed_flag.

Clause 33: The method of any of clauses 30-32, wherein inferring the values of the syntax elements comprises inferring the value of a pps_conformance_window_flag and a scaling_window_explicit_signaling flag.

Clause 34: A method of coding video data, the method comprising: coding a value for a single syntax element indicating a length in bits of picture order count (POC) most significant bits (MSBs) to be present in picture headers of a video bitstream; coding the POC MSBs of the picture headers according to the value for the single syntax element; and coding pictures corresponding to the picture headers using the POC MSBs.

Clause 35: The method of clause 34, further comprising the method of any of clauses 1-33.

Clause 36: A method of coding video data, the method comprising: coding a value for a syntax element indicating a number of explicitly provided slice heights in a current tile of video data that contains more than one rectangular slices, the value being in a range from 1 to a height of the current tile in rows; and coding video data of the current tile according to the value for the syntax element.

Clause 37: The method of clause 36, further comprising the method of any of clauses 1-35.

Clause 38: The method of any of clauses 6-37, wherein coding comprises decoding.

Clause 39: The method of any of clauses 6-38, wherein coding comprises encoding.

Clause 40: A device for processing or coding video data, the device comprising one or more means for performing the method of any of clauses 1-39.

Clause 41: The device of clause 40, wherein the one or more means comprise one or more processors implemented in circuitry.

Clause 42: The device of clause 40, further comprising a display configured to display decoded video data.

Clause 43: The device of clause 40, wherein the device comprises one or more of a camera, a computer, a mobile device, a broadcast receiver device, or a set-top box.

Clause 44: The device of clause 40, further comprising a memory configured to store the video data.

Clause 45: A computer-readable storage medium having stored thereon instructions that, when executed, cause a processor of a device for processing or coding video data to perform the method of any of clauses 1-39.

Clause 46: A method of decoding video data, the method comprising: determining that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, inferring values for OLS PTL index values, without explicitly decoding values for the OLS PTL index values; and decoding video data of one or more of the OLSs using corresponding PTL data structures of the PTL data structures in the VPS according to the inferred values for the OLS PTL index values.

Clause 47: The method of clause 46, wherein inferring the values for the OLS PTL index values comprises determining that an ith OLS PTL index value of the OLS PTL index values is equal to i for all values of i between 0 and the total number of OLSs.

Clause 48: The method of any of clauses 46 and 47, wherein decoding the video data of the one or more OLSs comprises decoding an ith one of the OLSs using an ith one of the PTL data structures for any value of i between 0 and the total number of OLSs.

Clause 49: The method of any of clauses 46-48, wherein the syntax element representing the number of PTL data structures in the VPS comprises vps_num_ptls_minus1.

Clause 50: The method of any of clauses 46-49, further comprising determining the total number of OLSs, including: when a maximum number of layers for the VPS minus 1 is equal to zero, determining that the total number of OLSs is equal to 1; when at least one of 1) each of the layers for the VPS is an OLS, 2) an OLS mode indicator value is equal to 0, or 3) the OLS mode indicator value is equal to 1, determining that the total number of OLSs is equal to the maximum number of layers for the VPS; or when the OLS mode indicator value is equal to 2, determining that the total number of OLSs is equal to a number of independent layers plus a value for a syntax element of the VPS indicating a number of OLSs.

Clause 51: The method of any of clauses 46-50, further comprising, in response to determining that a value for a syntax element representing a picture width in a picture parameter set (PPS) of the bitstream is a maximum picture width value and that a value for a syntax element representing a picture height in the PPS is a maximum picture height value, determining that a conformance window value is equal to zero.

Clause 52: The method of clause 51, further comprising, in response to determining that a conformance window value in a picture parameter set (PPS) is equal to zero, inferring values of conformance window offsets for the PPS as being equal to corresponding values of conformance window offsets for a sequence parameter set (SPS).

Clause 53: A device for decoding video data, the device comprising: a memory configured to store video data; and one or more processors implemented in circuitry and configured to: determine that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, infer values for OLS PTL index values, without explicitly decoding values for the OLS PTL index values; and decode the video data of one or more OLSs using corresponding PTL data structures of the PTL data structures in the VPS according to the inferred values for the OLS PTL index values.

Clause 54: The device of clause 53, wherein to infer the values for the OLS PTL index values, the one or more processors are configured to determine that an ith OLS PTL index value of the OLS PTL index values is equal to i for all values of i between 0 and the total number of OLSs.

Clause 55: The device of any of clauses 53 and 54, wherein to decode the video data of the one or more OLSs, the one or more processors are configured to decode an ith one of the OLSs using an ith one of the PTL data structures for any value of i between 0 and the total number of OLSs.

Clause 56: The device of any of clauses 53-55, wherein the syntax element representing the number of PTL data structures in the VPS comprises vps_num_ptls_minus1.

Clause 57: The device of any of clauses 53-56, wherein the one or more processors are further configured to determine the total number of OLSs, including: when a maximum number of layers for the VPS minus 1 is equal to zero, determine that the total number of OLSs is equal to 1; when at least one of 1) each of the layers for the VPS is an OLS, 2) an OLS mode indicator value is equal to 0, or 3) the OLS mode indicator value is equal to 1, determine that the total number of OLSs is equal to the maximum number of layers for the VPS; or when the OLS mode indicator value is equal to 2, determine that the total number of OLSs is equal to a number of independent layers plus a value for a syntax element of the VPS indicating a number of OLSs.

Clause 58: The device of any of clauses 53-57, wherein the one or more processors are further configured to, in response to determining that a value for a syntax element representing a picture width in a picture parameter set (PPS) of the bitstream is a maximum picture width value and that a value for a syntax element representing a picture height in the PPS is a maximum picture height value, determine that a conformance window value is equal to zero.

Clause 59: The device of clause 58, wherein the one or more processors are further configured to, in response to determining that a conformance window value in a picture parameter set (PPS) is equal to zero, infer values of conformance window offsets for the PPS as being equal to corresponding values of conformance window offsets for a sequence parameter set (SPS).

Clause 60: The device of clause 53, further comprising a display configured to display decoded video data.

Clause 61: The device of clause 53, wherein the device comprises one or more of a camera, a computer, a mobile device, a broadcast receiver device, or a set-top box.

Clause 62: A computer-readable storage medium having stored thereon instructions that, when executed, cause a processor to: determine that a value for a syntax element representing a number of profile-tier-level (PTL) data structures in a video parameter set (VPS) of a bitstream is equal to a total number of output layer sets (OLSs) specified for the VPS; in response to determining that the value for the syntax element representing the number of profile-tier-level data structures in the VPS is equal to the total number of OLSs specified for the VPS, infer values for OLS PTL index values, without explicitly decoding values for the OLS PTL index values; and decode video data of one or more OLSs using corresponding PTL data structures of the PTL data structures in the VPS according to the inferred values for the OLS PTL index values.

Clause 63: The computer-readable storage medium of clause 62, wherein the instructions that cause the processor to inferr the values for the OLS PTL index values comprise instructions that cause the processor to determine that an ith OLS PTL index value of the OLS PTL index values is equal to i for all values of i between 0 and the total number of OLSs.

Clause 64: The computer-readable storage medium of any of clauses 62 and 63, wherein the instructions that cause the processor to decode the one or more OLSs comprise instructions that cause the processor to decode an ith one of the OLSs using an ith one of the PTL data structures for any value of i between 0 and the total number of OLSs.

Clause 65: The computer-readable storage medium of any of clauses 62-64, wherein the syntax element representing the number of PTL data structures in the VPS comprises vps_num_ptls_minus1.

Clause 66: The computer-readable storage medium of any of clauses 62-65, further comprising instructions that cause the processor to determine the total number of OLSs, including instructions that cause the processor to: when a maximum number of layers for the VPS minus 1 is equal to zero, determine that the total number of OLSs is equal to 1; when at least one of 1) each of the layers for the VPS is an OLS, 2) an OLS mode indicator value is equal to 0, or 3) the OLS mode indicator value is equal to 1, determine that the total number of OLSs is equal to the maximum number of layers for the VPS; or when the OLS mode indicator value is equal to 2, determine that the total number of OLSs is equal to a number of independent layers plus a value for a syntax element of the VPS indicating a number of OLSs.

Clause 67: The computer-readable storage medium of any of clauses 62-66, further comprising instructions that cause the processor to, in response to determining that a value for a syntax element representing a picture width in a picture parameter set (PPS) of the bitstream is a maximum picture width value and that a value for a syntax element representing a picture height in the PPS is a maximum picture height value, determine that a conformance window value is equal to zero.

Clause 68: The computer-readable storage medium of clause 67, further comprising instructions that cause the processor to, in response to determining that a conformance window value in a picture parameter set (PPS) is equal to zero, infer values of conformance window offsets for the PPS as being equal to corresponding values of conformance window offsets for a sequence parameter set (SPS).

Clause 69: A device for decoding video data, the device comprising: means for determining that a value for a syntax element representing a number of profile-tier-level (PTL) data structures in a video parameter set (VPS) of a bitstream is equal to a total number of output layer sets (OLSs) specified for the VPS; means for inferring values for OLS PTL index values, without explicitly decoding values for the OLS PTL index values, in response to determining that the value for the syntax element representing the number of profile-tier-level data structures in the VPS is equal to the total number of OLSs specified for the VPS; and means for decoding video data of one or more OLSs using corresponding PTL data structures of the PTL data structures in the VPS according to the inferred values for the OLS PTL index values.

Clause 70: The device of clause 69, wherein the means for inferring the values for the OLS PTL index values comprises means for determining that an ith OLS PTL index value of the OLS PTL index values is equal to i for all values of i between 0 and the total number of OLSs.

Clause 71: The device of any of clauses 69 and 70, wherein the means for decoding the one or more OLSs comprises means for decoding an ith one of the OLSs using an ith one of the PTL data structures for any value of i between 0 and the total number of OLSs.

Clause 72: The device of any of clauses 69-71, wherein the syntax element representing the number of PTL data structures in the VPS comprises vps_num_ptls_minus1.

Clause 73: The device of any of clauses 69-72, further comprising means for determining the total number of OLSs, including: means for determining that the total number of OLSs is equal to 1 when a maximum number of layers for the VPS minus 1 is equal to zero; means for determining that the total number of OLSs is equal to the maximum number of layers for the VPS when at least one of 1) each of the layers for the VPS is an OLS, 2) an OLS mode indicator value is equal to 0, or 3) the OLS mode indicator value is equal to 1; or means for determining that the total number of OLSs is equal to a number of independent layers plus a value for a syntax element of the VPS indicating a number of OLSs when the OLS mode indicator value is equal to 2.

Clause 74: The device of any of clauses 69-73, further comprising means for determining that a conformance window value is equal to zero in response to determining that a value for a syntax element representing a picture width in a picture parameter set (PPS) of the bitstream is a maximum picture width value and that a value for a syntax element representing a picture height in the PPS is a maximum picture height value.

Clause 75: The device of clause 74, further comprising means for inferring values of conformance window offsets for the PPS as being equal to corresponding values of conformance window offsets for a sequence parameter set (SPS) in response to determining that a conformance window value in a picture parameter set (PPS) is equal to zero.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a value for a syntax element representing a number of profile-tier-level (PTL) data structures in a video parameter set (VPS) of a bitstream is equal to a total number of output layer sets (OLSs) specified for the VPS;
   in response to determining that the value for the syntax element representing the number of profile-tier-level data structures in the VPS is equal to the total number of OLSs specified for the VPS, inferring values for OLS PTL index values, without explicitly decoding values for the OLS PTL index values; and
   decoding video data of one or more of the OLSs using corresponding PTL data structures of the PTL data structures in the VPS according to the inferred values for the OLS PTL index values.

2. The method of claim 1, wherein inferring the values for the OLS PTL index values comprises determining that an $i^{th}$ OLS PTL index value of the OLS PTL index values is equal to i for all values of i between 0 and the total number of OLSs.

3. The method of claim 1, wherein decoding the video data of the one or more OLSs comprises decoding an $i^{th}$ one of the OLSs using an $i^{th}$ one of the PTL data structures for any value of i between 0 and the total number of OLSs.

4. The method of claim 1, wherein the syntax element representing the number of PTL data structures in the VPS comprises vps_num_ptls_minus1.

5. The method of claim 1, further comprising determining the total number of OLSs, including:
   when a maximum number of layers for the VPS minus 1 is equal to zero, determining that the total number of OLSs is equal to 1;
   when at least one of 1) each of the layers for the VPS is an OLS, 2) an OLS mode indicator value is equal to 0, or 3) the OLS mode indicator value is equal to 1, determining that the total number of OLSs is equal to the maximum number of layers for the VPS; or when the OLS mode indicator value is equal to 2, determining that the total number of OLSs is equal to a number of independent layers plus a value for a syntax element of the VPS indicating a number of OLSs.

6. The method of claim 1, further comprising, in response to determining that a value for a syntax element representing a picture width in a picture parameter set (PPS) of the bitstream is a maximum picture width value and that a value for a syntax element representing a picture height in the PPS is a maximum picture height value, determining that a conformance window value is equal to zero.

7. The method of claim 1, further comprising, in response to determining that a conformance window value in a picture parameter set (PPS) is equal to zero, inferring values of conformance window offsets for the PPS as being equal to corresponding values of conformance window offsets for a sequence parameter set (SPS).

8. A device for decoding video data, the device comprising:
a memory configured to store video data; and
one or more processors implemented in circuitry and configured to:
determine that a value for a syntax element representing a number of profile-tier-level (PTL) data structures in a video parameter set (VPS) of a bitstream is equal to a total number of output layer sets (OLSs) specified for the VPS;
in response to determining that the value for the syntax element representing the number of profile-tier-level data structures in the VPS is equal to the total number of OLSs specified for the VPS, infer values for OLS PTL index values, without explicitly decoding values for the OLS PTL index values; and
decode the video data of one or more OLSs using corresponding PTL data structures of the PTL data structures in the VPS according to the inferred values for the OLS PTL index values.

9. The device of claim 8, wherein to infer the values for the OLS PTL index values, the one or more processors are configured to determine that an $i^{th}$ OLS PTL index value of the OLS PTL index values is equal to i for all values of i between 0 and the total number of OLSs.

10. The device of claim 8, wherein to decode the video data of the one or more OLSs, the one or more processors are configured to decode an $i^{th}$ one of the OLSs using an $i^{th}$ one of the PTL data structures for any value of i between 0 and the total number of OLSs.

11. The device of claim 8, wherein the syntax element representing the number of PTL data structures in the VPS comprises vps_num_ptls_minus1.

12. The device of claim 8, wherein the one or more processors are further configured to determine the total number of OLSs, including:
when a maximum number of layers for the VPS minus 1 is equal to zero, determine that the total number of OLSs is equal to 1;
when at least one of 1) each of the layers for the VPS is an OLS, 2) an OLS mode indicator value is equal to 0, or 3) the OLS mode indicator value is equal to 1, determine that the total number of OLSs is equal to the maximum number of layers for the VPS; or
when the OLS mode indicator value is equal to 2, determine that the total number of OLSs is equal to a number of independent layers plus a value for a syntax element of the VPS indicating a number of OLSs.

13. The device of claim 8, wherein the one or more processors are further configured to, in response to determining that a value for a syntax element representing a picture width in a picture parameter set (PPS) of the bitstream is a maximum picture width value and that a value for a syntax element representing a picture height in the PPS is a maximum picture height value, determine that a conformance window value is equal to zero.

14. The device of claim 8, wherein the one or more processors are further configured to, in response to determining that a conformance window value in a picture parameter set (PPS) is equal to zero, infer values of conformance window offsets for the PPS as being equal to corresponding values of conformance window offsets for a sequence parameter set (SPS).

15. The device of claim 8, further comprising a display configured to display decoded video data.

16. The device of claim 8, wherein the device comprises one or more of a camera, a computer, a mobile device, a broadcast receiver device, or a set-top box.

17. A non-transitory computer-readable storage medium having stored thereon instructions that, when executed, cause a processor to:
determine that a value for a syntax element representing a number of profile-tier-level (PTL) data structures in a video parameter set (VPS) of a bitstream is equal to a total number of output layer sets (OLSs) specified for the VPS;
in response to determining that the value for the syntax element representing the number of profile-tier-level data structures in the VPS is equal to the total number of OLSs specified for the VPS, infer values for OLS PTL index values, without explicitly decoding values for the OLS PTL index values; and
decode video data of one or more OLSs using corresponding PTL data structures of the PTL data structures in the VPS according to the inferred values for the OLS PTL index values.

18. The non-transitory computer-readable storage medium of claim 17, wherein the instructions that cause the processor to infer the values for the OLS PTL index values comprise instructions that cause the processor to determine that an $i^{th}$ OLS PTL index value of the OLS PTL index values is equal to i for all values of i between 0 and the total number of OLSs.

19. The non-transitory computer-readable storage medium of claim 17, wherein the instructions that cause the processor to decode the one or more OLSs comprise instructions that cause the processor to decode an $i^{th}$ one of the OLSs using an $i^{th}$ one of the PTL data structures for any value of i between 0 and the total number of OLSs.

20. The non-transitory computer-readable storage medium of claim 17, wherein the syntax element representing the number of PTL data structures in the VPS comprises vps_num_ptls_minus1.

21. The non-transitory computer-readable storage medium of claim 17, further comprising instructions that cause the processor to determine the total number of OLSs, including instructions that cause the processor to:
when a maximum number of layers for the VPS minus 1 is equal to zero, determine that the total number of OLSs is equal to 1;
when at least one of 1) each of the layers for the VPS is an OLS, 2) an OLS mode indicator value is equal to 0, or 3) the OLS mode indicator value is equal to 1, determine that the total number of OLSs is equal to the maximum number of layers for the VPS; or
when the OLS mode indicator value is equal to 2, determine that the total number of OLSs is equal to a number of independent layers plus a value for a syntax element of the VPS indicating a number of OLSs.

22. The non-transitory computer-readable storage medium of claim 17, further comprising instructions that cause the processor to, in response to determining that a value for a syntax element representing a picture width in a picture parameter set (PPS) of the bitstream is a maximum picture width value and that a value for a syntax element representing a picture height in the PPS is a maximum picture height value, determine that a conformance window value is equal to zero.

23. The non-transitory computer-readable storage medium of claim 17, further comprising instructions that cause the processor to, in response to determining that a conformance window value in a picture parameter set (PPS) is equal to zero, infer values of conformance window offsets for the PPS as being equal to corresponding values of conformance window offsets for a sequence parameter set (SPS).

24. A device for decoding video data, the device comprising:
    means for determining that a value for a syntax element representing a number of profile-tier-level (PTL) data structures in a video parameter set (VPS) of a bitstream is equal to a total number of output layer sets (OLSs) specified for the VPS;
    means for inferring values for OLS PTL index values, without explicitly decoding values for the OLS PTL index values, in response to determining that the value for the syntax element representing the number of profile-tier-level data structures in the VPS is equal to the total number of OLSs specified for the VPS; and
    means for decoding video data of one or more OLSs using corresponding PTL data structures of the PTL data structures in the VPS according to the inferred values for the OLS PTL index values.

25. The device of claim 24, wherein the means for inferring the values for the OLS PTL index values comprises means for determining that an $i^{th}$ OLS PTL index value of the OLS PTL index values is equal to i for all values of i between 0 and the total number of OLSs.

26. The device of claim 24, wherein the means for decoding the one or more OLSs comprises means for decoding an $i^{th}$ one of the OLSs using an $i^{th}$ one of the PTL data structures for any value of i between 0 and the total number of OLSs.

27. The device of claim 24, wherein the syntax element representing the number of PTL data structures in the VPS comprises vps_num_ptls_minus1.

28. The device of claim 24, further comprising means for determining the total number of OLSs, including:
    means for determining that the total number of OLSs is equal to 1 when a maximum number of layers for the VPS minus 1 is equal to zero;
    means for determining that the total number of OLSs is equal to the maximum number of layers for the VPS when at least one of 1) each of the layers for the VPS is an OLS, 2) an OLS mode indicator value is equal to 0, or 3) the OLS mode indicator value is equal to 1; or
    means for determining that the total number of OLSs is equal to a number of independent layers plus a value for a syntax element of the VPS indicating a number of OLSs when the OLS mode indicator value is equal to 2.

29. The device of claim 24, further comprising means for determining that a conformance window value is equal to zero in response to determining that a value for a syntax element representing a picture width in a picture parameter set (PPS) of the bitstream is a maximum picture width value and that a value for a syntax element representing a picture height in the PPS is a maximum picture height value.

30. The device of claim 24, further comprising means for inferring values of conformance window offsets for the PPS as being equal to corresponding values of conformance window offsets for a sequence parameter set (SPS) in response to determining that a conformance window value in a picture parameter set (PPS) is equal to zero.

* * * * *